US011027197B2

(12) United States Patent
Butler

(10) Patent No.: US 11,027,197 B2
(45) Date of Patent: Jun. 8, 2021

(54) SERVERLESS GAMING THROUGH ZERO-KNOWLEDGE PROOFS

(71) Applicant: Sony Interactive Entertainment Inc., Tokyo (JP)

(72) Inventor: Dylan Butler, Mission Viejo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/588,939

(22) Filed: Sep. 30, 2019

(65) Prior Publication Data

US 2021/0093954 A1 Apr. 1, 2021

(51) Int. Cl.
| | | |
|---|---|---|
| A63F 13/00 | (2014.01) | |
| A63F 13/35 | (2014.01) | |
| A63F 13/335 | (2014.01) | |
| A63F 13/79 | (2014.01) | |
| A63F 13/32 | (2014.01) | |
| A63F 13/77 | (2014.01) | |
| A63F 13/71 | (2014.01) | |

(52) U.S. Cl.
CPC .............. *A63F 13/35* (2014.09); *A63F 13/32* (2014.09); *A63F 13/335* (2014.09); *A63F 13/71* (2014.09); *A63F 13/77* (2014.09); *A63F 13/79* (2014.09); *A63F 2300/407* (2013.01)

(58) Field of Classification Search
None
See application file for complete search history.

(56) References Cited

U.S. PATENT DOCUMENTS

| 10,217,317 B2 * | 2/2019 | Nelson | G07F 17/3209 |
| 10,297,106 B1 * | 5/2019 | Simons | G07F 17/3251 |
| 2003/0203756 A1 * | 10/2003 | Jackson | G07F 17/32 463/42 |

(Continued)

FOREIGN PATENT DOCUMENTS

WO 2013188900 A1 12/2013

OTHER PUBLICATIONS

PCT International Search Report and Written Opinion of the International Searching Authority issued in corresponding International Patent Application No. PCT/US2020/053471 dated Jan. 25, 2021 (PCT Forms ISA 220, 210, 237) (14 total pages).

(Continued)

*Primary Examiner* — Paul A D'Agostino
(74) *Attorney, Agent, or Firm* — Penilla IP, APC

(57) ABSTRACT

A method for processing a serverless video game includes generating, at a first node, a notification to a second node to join play of the serverless video game, and confirming, by the first node, that the second node has joined to play. The joining by the second node creates a peer-to-peer communication process for executing an application layer for the serverless video game. The method also includes executing, at each of the first node and the second node a consensus algorithm for verifying moves processed by the application layer that runs game rules for the serverless video game. The consensus algorithm is configured to independently process at each of the first and second nodes the verifying of the moves. In one example, the consensus algorithm of each of the nodes is configured to process one or more zero-knowledge proofs for verifying moves made during play of the serverless video game.

19 Claims, 18 Drawing Sheets

(56) References Cited

U.S. PATENT DOCUMENTS

| | | | |
|---|---|---|---|
| 2004/0139159 A1* | 7/2004 | Ricciardi | A63F 13/35 709/205 |
| 2007/0149279 A1* | 6/2007 | Norden | H04L 67/1063 463/29 |
| 2008/0268934 A1* | 10/2008 | Mattice | G07F 17/32 463/16 |
| 2008/0300059 A1* | 12/2008 | Adiraju | G07F 17/32 463/42 |
| 2010/0146085 A1* | 6/2010 | Van Wie | H04L 67/1059 709/220 |
| 2012/0071243 A1 | 3/2012 | Kojima et al. | |
| 2013/0143667 A1 | 6/2013 | Osako | |
| 2017/0021280 A1* | 1/2017 | Sugavanam | A63F 13/21 |
| 2018/0047249 A1* | 2/2018 | Nelson | G07F 17/3211 |
| 2018/0114403 A1* | 4/2018 | Jayachandran | H04L 9/3297 |
| 2018/0189730 A1* | 7/2018 | Wilkinson | G06Q 10/0836 |
| 2018/0197172 A1* | 7/2018 | Coburn | A63F 13/792 |
| 2018/0264347 A1* | 9/2018 | Tran | G06K 9/00671 |
| 2018/0316716 A1* | 11/2018 | Kozloski | A63F 13/79 |
| 2018/0344215 A1* | 12/2018 | Ohnemus | A63F 13/798 |
| 2019/0026146 A1* | 1/2019 | Peffers | G06F 9/5044 |
| 2019/0028265 A1* | 1/2019 | Bisti | A63F 13/71 |
| 2019/0034975 A1* | 1/2019 | Rizk | G06Q 30/0218 |
| 2019/0096021 A1* | 3/2019 | Jarvis | G06F 21/34 |
| 2019/0122300 A1* | 4/2019 | O'Brien | G07F 17/3286 |
| 2019/0130698 A1* | 5/2019 | Simons | G07F 17/3251 |
| 2019/0130701 A1* | 5/2019 | Simons | G07F 17/3288 |
| 2019/0164153 A1* | 5/2019 | Agrawal | G06Q 20/383 |
| 2019/0282906 A1* | 9/2019 | Yong | A63F 13/69 |
| 2019/0314726 A1* | 10/2019 | Masini | A63F 13/71 |
| 2019/0385096 A1* | 12/2019 | Ibrahim | G07F 17/0014 |
| 2020/0082668 A1* | 3/2020 | Foley | G07F 17/3223 |
| 2020/0105096 A1* | 4/2020 | Ovalle | G07F 17/3225 |
| 2020/0126355 A1* | 4/2020 | Yi | G06F 21/34 |
| 2020/0151842 A1* | 5/2020 | O'Brien | G07F 17/34 |
| 2020/0152005 A1* | 5/2020 | Higgins | G07F 17/3244 |
| 2020/0155944 A1* | 5/2020 | Witchey | G06F 16/2379 |
| 2020/0193429 A1* | 6/2020 | Babar | H04L 9/0637 |

OTHER PUBLICATIONS

Baughman, N. E. And Levine, B.N., "Cheat-proof playout for centralized and distributed online games," Proceedings IEEE INFOCOM 2001, Conference on Computer Communications, Twentieth Annual Joint Conference of the IEEE computer and Communications Society, Anchorage, AK, USA, 2001, pp. 104-113 vol. 1 (10 total pages).

* cited by examiner

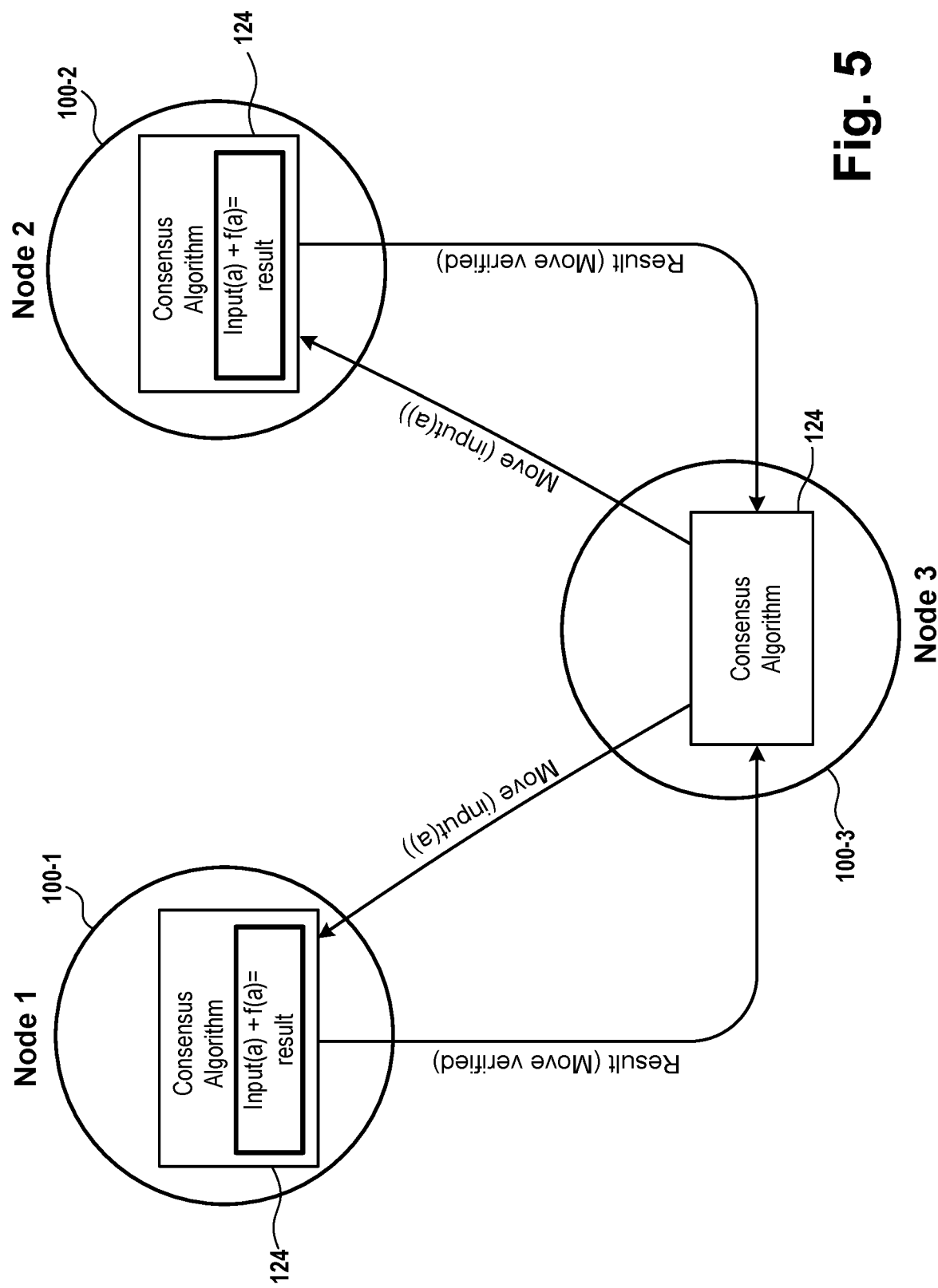

| Move | Node 1 | Node 2 | Node 3 |
|---|---|---|---|
| 1 | Ante | | |
| 2 | | Ante | |
| 3 | | | Ante |
| 4 | Deal Card 1 | | |
| 5 | | Deal Card 1 | |
| 6 | | | Deal Card 1 |
| 7 | Deal Card 2 | | |
| 8 | | Deal Card 2 | |
| 9 | | | Deal Card 2 |
| 10 | Deal Card 3 | | |
| 11 | | Deal Card 3 | |
| 12 | | | Deal Card 3 |
| 13 | Deal Card 4 | | |
| 14 | | Deal Card 4 | |
| 15 | | | Deal Card 4 |
| 16 | Deal Card 5 | | |
| 17 | | Deal Card 5 | |
| 18 | | | Deal Card 5 |
| 19 | Bet | | |
| 20 | | Bet | |
| 21 | | | Bet |
| 22 | Discard/Deal | | |
| 23 | | Discard/Deal | |
| 24 | | | Discard/Deal |
| 25 | Bet | | |
| 26 | | Bet | |
| 27 | | | Bet |
| End | Show Result | Show Result | Show Result |

Fig. 6

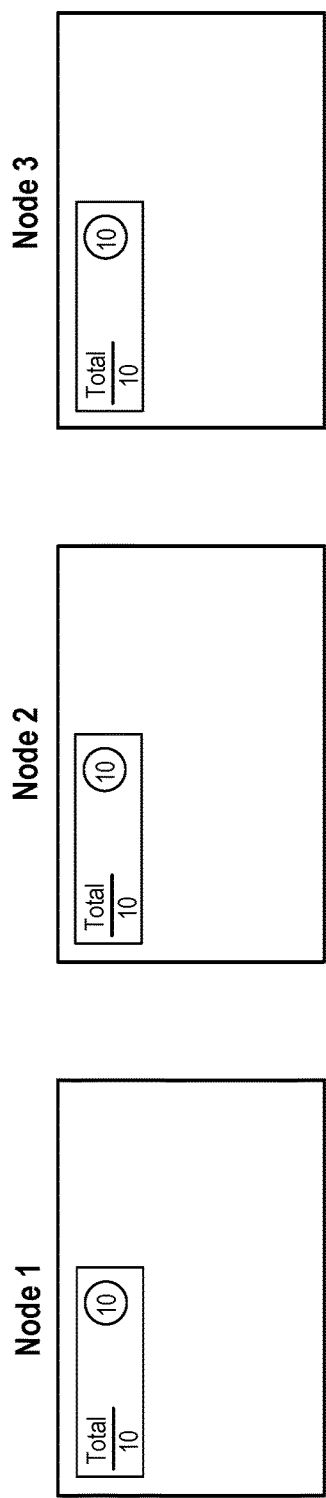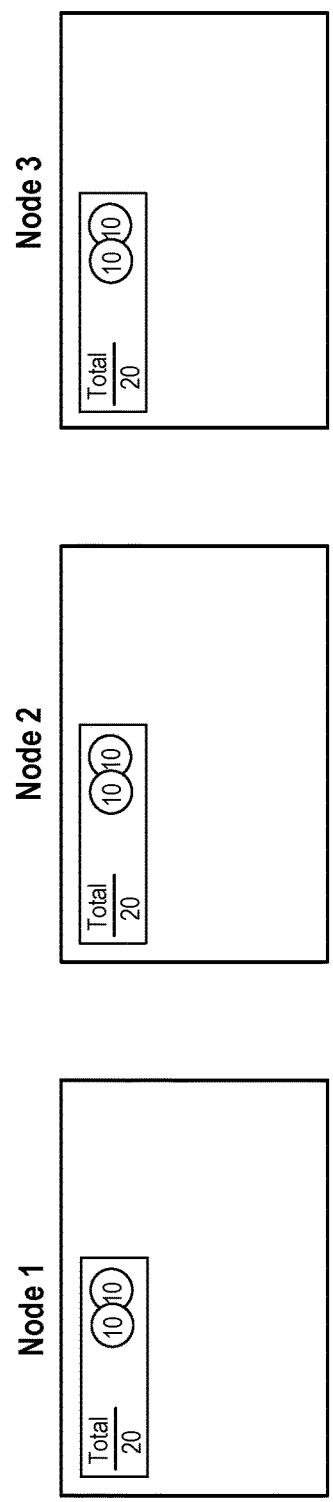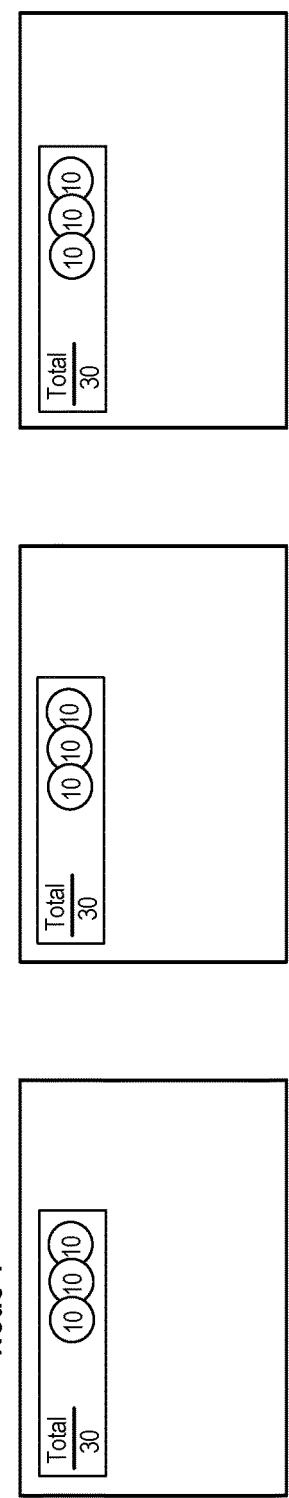

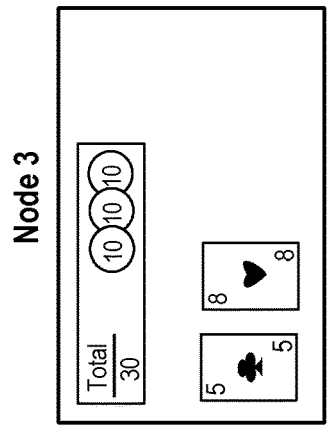
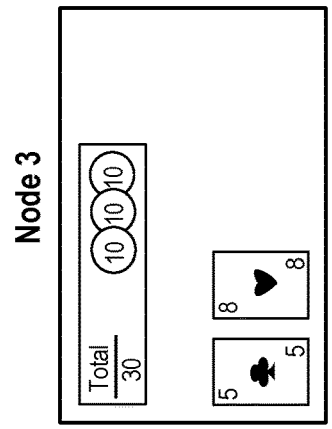
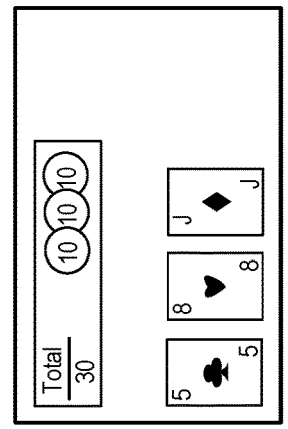
Fig. 7-10  Fig. 7-11  Fig. 7-12
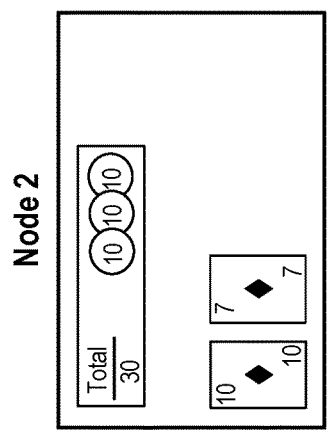
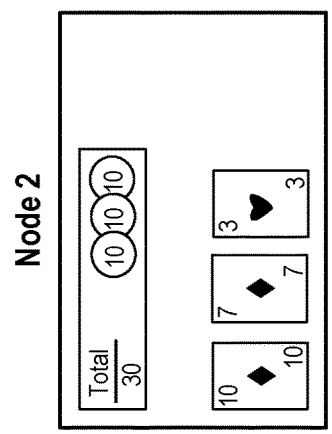
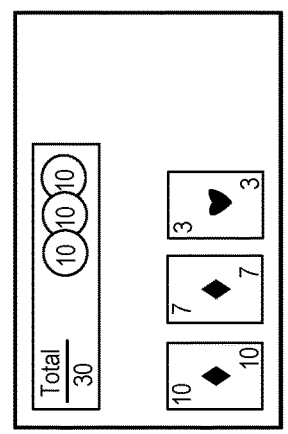
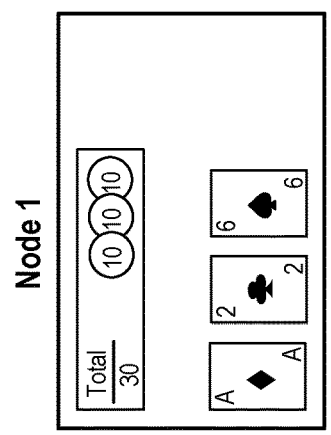
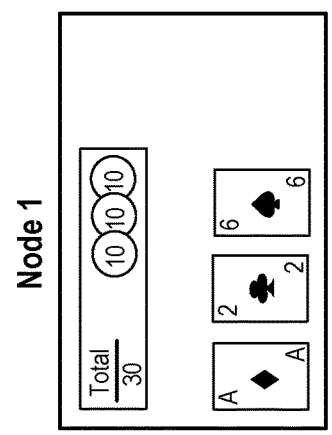
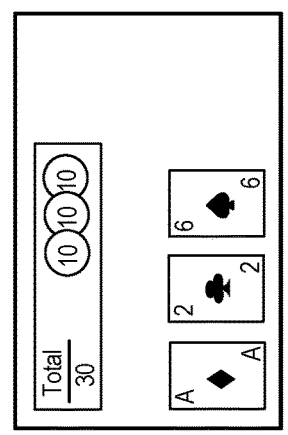

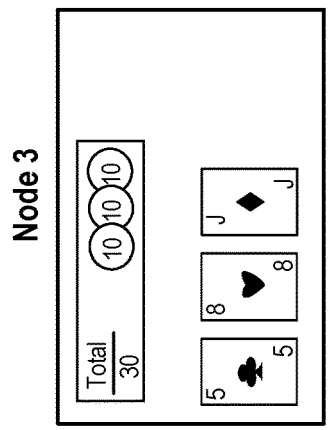
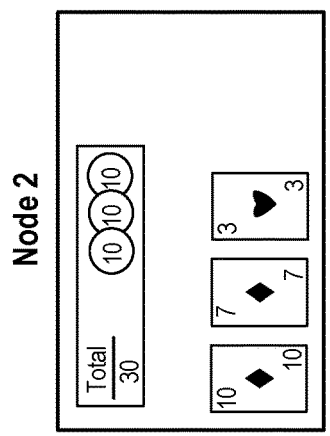
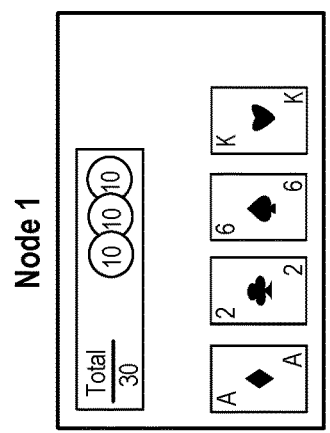
Fig. 7-13
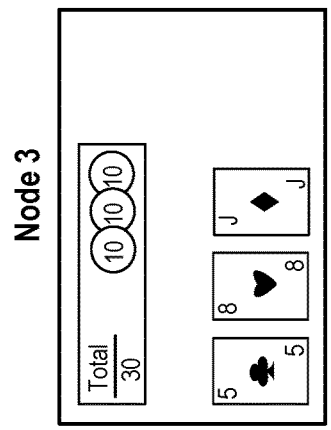
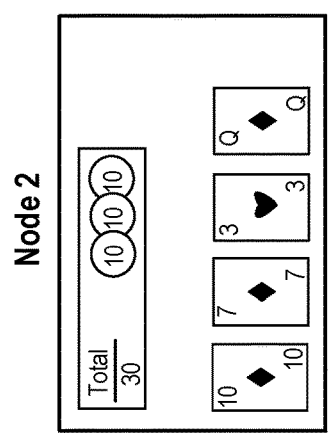
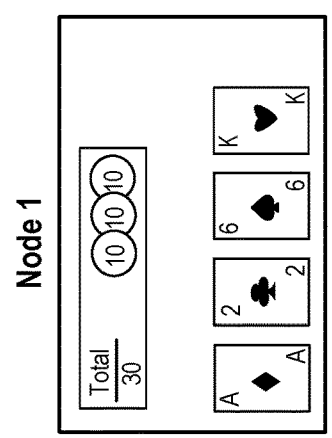
Fig. 7-14
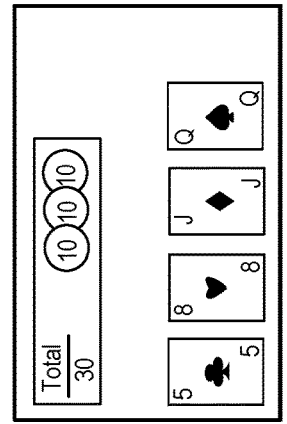
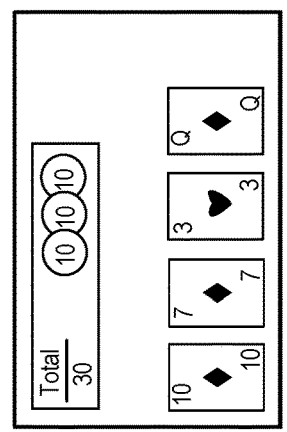
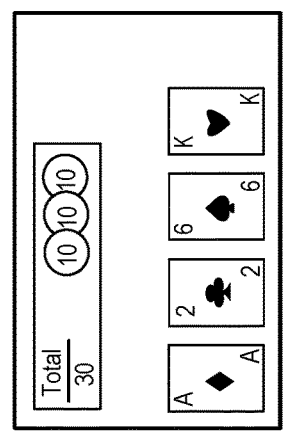
Fig. 7-15

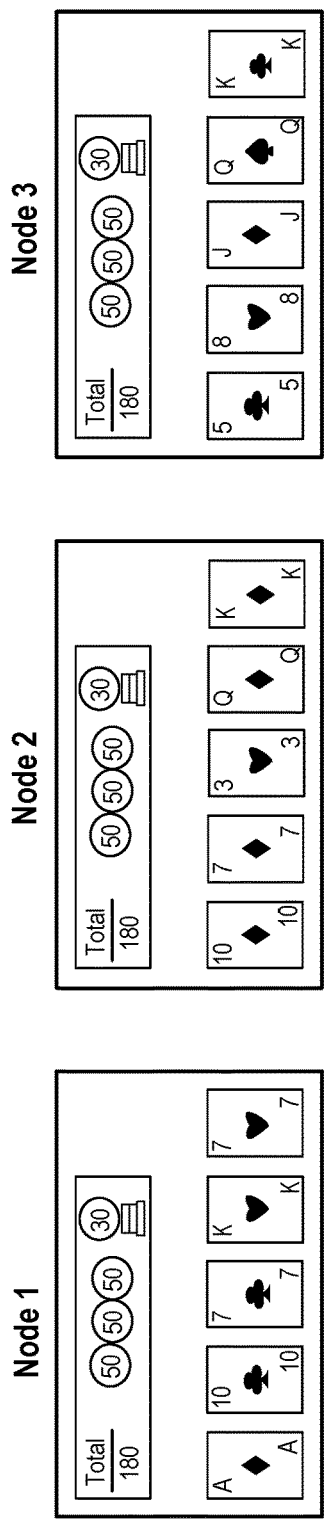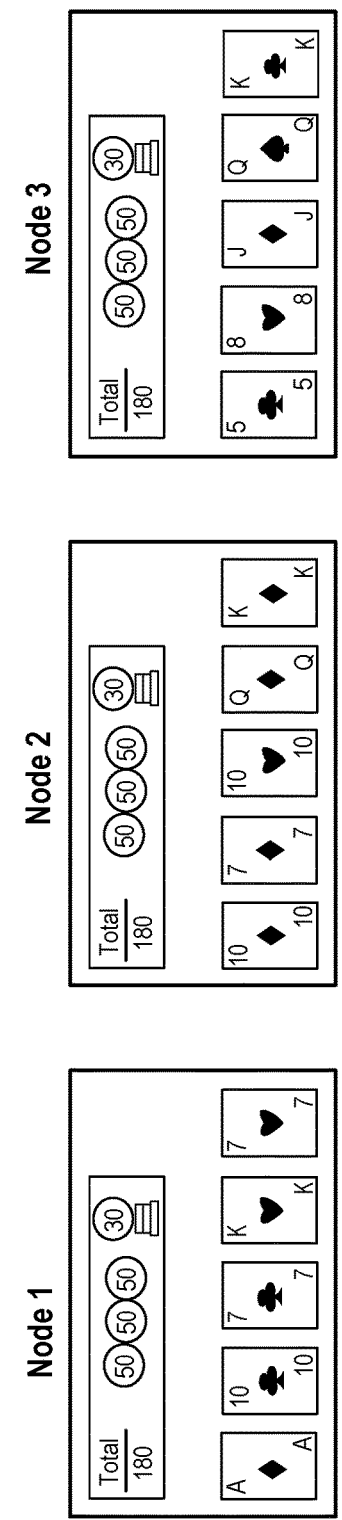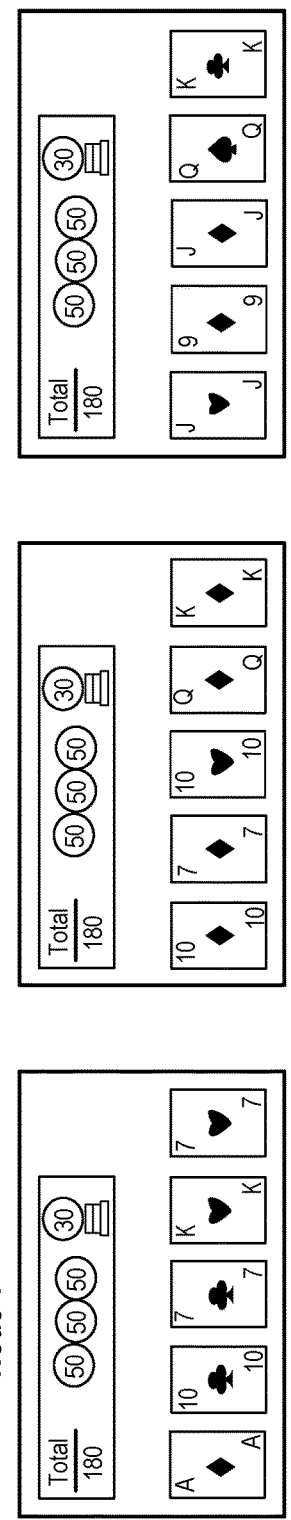
Fig. 7-22  Fig. 7-23  Fig. 7-24

SERVERLESS GAMING THROUGH ZERO-KNOWLEDGE PROOFS

BACKGROUND

Online video games are played by millions of players throughout the world. For example, massively multiplayer online role-playing games (MMORPGs) such as World of Warcraft and Diablo III enjoy widespread popularity. Other popular online video games include sports-related games, e.g., Madden NFL 19 and NBA 2K19, and card-related games, e.g., online poker and blackjack. One downside of online video games is that they use server-based gaming system architecture. The servers used in these gaming systems are subject to malicious attacks. Consequently, users can be scammed or otherwise exploited when engaging in game-related activities such as, for example, auctions, trading, loot boxes, in-game currency, and gambling.

It is in this context that embodiments arise.

SUMMARY

In an example embodiment, a method for processing a serverless video game is provided. The method includes generating, at a first node, a notification to a second node to join play of the serverless video game, and confirming, by the first node, that the second node has joined to play the serverless video game. The joining by the second node creates a peer-to-peer communication process for executing an application layer for the serverless video game. The method also includes executing, at each of the first node and the second node a consensus algorithm for verifying moves processed by the application layer that runs game rules for the serverless video game. The consensus algorithm at each of the first node and the second node respectively maintains a database for storing a history of the moves by each one of the first and second nodes. In addition, the consensus algorithm is configured to independently process at each of the first and second nodes the verifying of the moves. The method further includes generating, at the first node, a first move, and responsive to the first move sending to the second node a message regarding the first move, such that the second node is configured to receive the message regarding the first move by the first node. The consensus algorithm at the second node is configured to validate or invalidate the first move. The method also includes receiving, by the first node from the second node, a confirmation message regarding validity or invalidity of the first move by the first node.

In one embodiment, the method further includes enabling joining of additional nodes for playing the serverless video game, with each of the joining nodes being configured to execute a respective consensus algorithm for verifying moves of other nodes. In one embodiment, the history is transferred to each joining node. In one embodiment, the history is stored locally on the database of each of the nodes.

In one embodiment, the serverless video game executes for a session, and the method further includes storing the history to a block chain storage at a stop of play to enable later retrieval and resumption of the play. In one embodiment, the serverless video game is executed during one or more sessions, and the method further includes storing the history from the databases of the nodes to a block chain storage to enable a later resumption of play during another session.

In one embodiment, the method further includes joining, by either the first node or the second node, a third node to play the serverless video game, transferring, by either the first node or the second node, the history to the third node to enable a consensus algorithm to be executed on the third node in coordination with the consensus algorithm of each of the first and second nodes, with each move of the third node being configured to be verified by each of the first and second nodes.

In one embodiment, the consensus algorithm of each of the nodes is configured to process one or more zero-knowledge proofs for verifying moves made during play of the serverless video game. In one embodiment, the zero-knowledge proofs use information from the history and information received from other nodes to verify the moves against the game rules processed by the application layer of each of the nodes.

In one embodiment, the consensus algorithm of each of the first node and the second node is configured to process one or more zero-knowledge proofs to determine a winner of the serverless video game, and the consensus algorithm of each of the first node and the second node returns a true or false result as to whether the node won the serverless video game. In one embodiment, the consensus algorithm of each of the first node and the second node is configured to process one or more zero-knowledge proofs to determine a winner of an auction in the serverless video game, and the consensus algorithm of each of the first node and the second node returns a true or false result as to whether the node won the auction.

In one embodiment, the method further includes accessing, by one of the first or second nodes, a server to request discovery of nodes for playing the serverless video game. In one embodiment, the server is configured to process message data to enable the first or second nodes to message one or more of the nodes that were discovered for playing the serverless video game.

In another example embodiment, a second method for processing a serverless video game is provided. The method includes generating, at a first node, a notification to a second node to join play of the serverless video game during a session, and confirming, by the first node, that the second node has joined to play the serverless video game. The joining by the second node creates a peer-to-peer communication process for executing an application layer for the serverless video game. The method also includes executing, at each of the first node and the second node a consensus algorithm for verifying actions processed by the application layer that runs game rules for the serverless video game. The consensus algorithm at each of the first node and the second node respectively maintains a database for storing a history of the actions by each one of the first and second nodes. In addition, the consensus algorithm is configured to independently process at each of the first and second nodes the verifying of the actions. The method further includes generating, at the first node, a first action, and responsive to the first action sending to the second node a message regarding the first action, such that the second node is configured to receive the message regarding the first action by the first node. The consensus algorithm at the second node is configured to validate or invalidate the first action. The method also includes receiving, by the first node from the second node, a confirmation message regarding validity or invalidity of the first action by the first node. The history is stored to a server database upon termination of the session by the first and second nodes.

In one embodiment, the server database is a block chain storage. In one embodiment, the consensus algorithm of each of the first node and the second node is configured to process one or more zero-knowledge proofs for verifying actions made during play of the serverless video game.

In one embodiment, the consensus algorithm of each of the first node and the second node is configured to process one or more zero-knowledge proofs to determine a winner of the serverless video game, and the consensus algorithm of each of the first node and the second node returns a true or false result as to whether the node won the serverless video game. In one embodiment, the consensus algorithm of each of the first node and the second node is configured to process one or more zero-knowledge proofs to determine a winner of an auction in the serverless video game, and the consensus algorithm of each of the first node and the second node returns a true or false result as to whether the node won the auction.

In yet another example embodiment, a computer readable medium containing non-transitory program instructions for processing a serverless video game is provided. The execution of the program instructions by one or more processors of a computer system causes the one or more processors to carry out the operations of, for example, either of the methods for processing a serverless video game described herein.

Other aspects and advantages of the disclosures herein will become apparent from the following detailed description, taken in conjunction with the accompanying drawings, which illustrate by way of example the principles of the disclosures.

BRIEF DESCRIPTION OF THE DRAWINGS

FIGS. 3-5 are simplified schematic diagrams that illustrate how the nodes involved in a game communicate with each other when a game move is made and verify that the game move is proper, in accordance with one embodiment.

FIG. 6 is a table showing the game moves made in an example ZKP game of online poker.

FIGS. 7-1 to 7-28 are a series of drawings which illustrate the information displayed by the respective user interfaces for the nodes during an example ZKP game of online poker.

FIG. 8 is a simplified schematic diagram illustrating the process by which a new player can join a ZKP game, in accordance with one embodiment.

FIG. 9 illustrates an embodiment of an Information Service Provider architecture.

DETAILED DESCRIPTION

Figure 1:
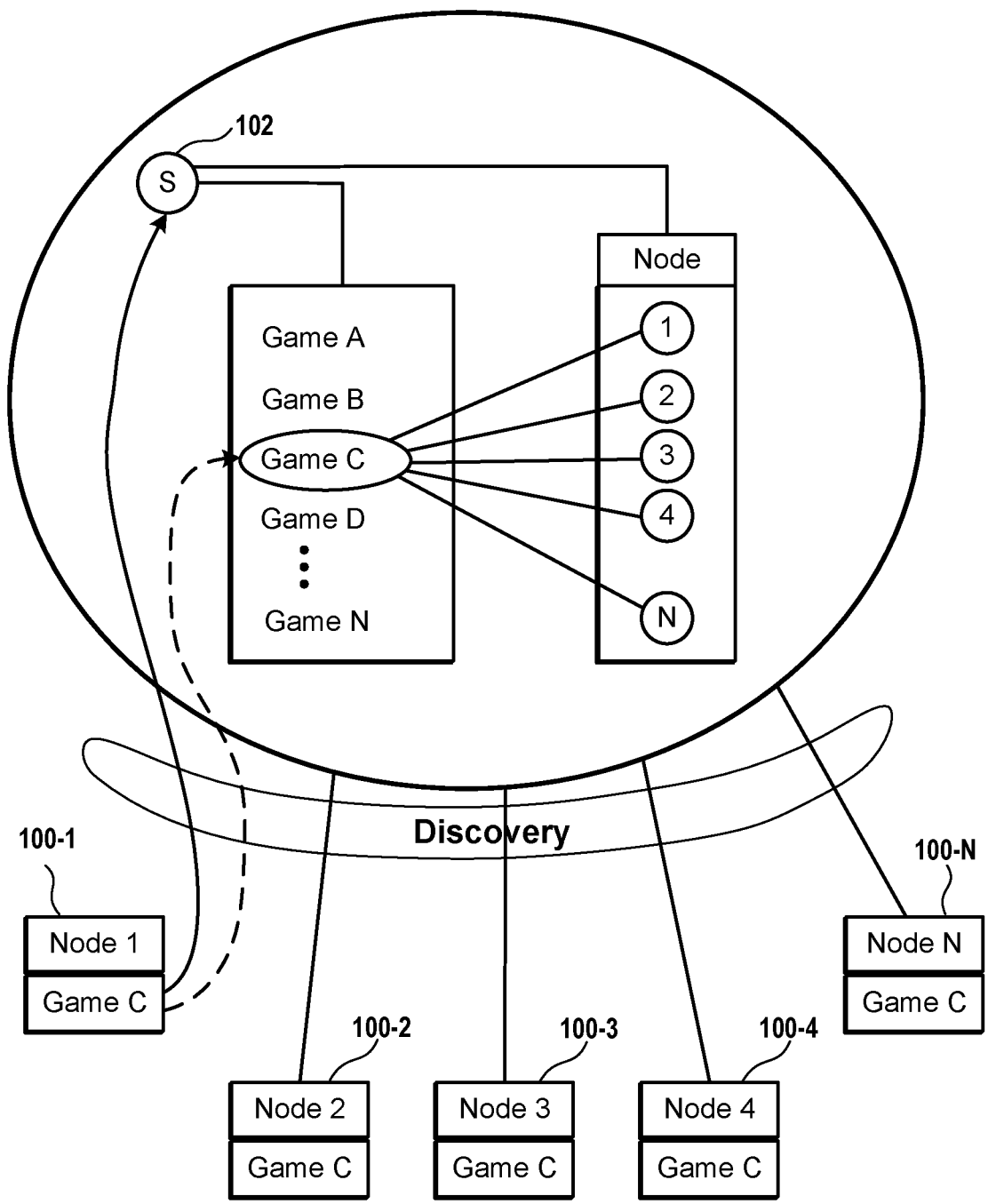
FIG. 1 is a simplified schematic diagram illustrating an example discovery process by which a peer-to-peer zero-knowledge proof (ZKP) game is established, in accordance with one embodiment.

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

Embodiments of the present invention provide a method for achieving consensus in a serverless (decentralized) gaming system architecture. Without a centralized server, which is typically the attack vector targeted by hackers, the gaming system is significantly more difficult to attack. To achieve consensus while maintaining privacy, embodiments of the invention use zero-knowledge proofs, which are a cryptographic means of proving to a verifier that a prover has a secret without revealing the secret to the verifier.

In one embodiment, a method for processing a serverless video game is provided. One method operation includes generating, at a first node, a notification to a second node to join play of the serverless video game. For the same user account, the notification can be on one device, e.g., a smartphone, and the play of the serverless video game can be on a second device, e.g., a tablet computer or a laptop computer. Another method operation includes confirming, by the first node, that the second node has joined to play the serverless video game. The joining by the second node creates a peer-to-peer communication process for executing an application layer for the serverless video game, as will be described in more detail below.

Yet another method operation includes executing, at each of the first node and the second node a consensus algorithm for verifying moves processed by the application layer that runs game rules for the serverless video game. The consensus algorithm at each of the first node and the second node respectively maintains a database for storing a history of the moves by each one of the first and second nodes. In addition, the consensus algorithm is configured to independently process at each of the first and second nodes the verifying of the game moves. In one embodiment, the consensus algorithm is configured to process one or more zero-knowledge proofs for verifying moves made during play of the serverless video game. Additional details regarding the consensus algorithm are set forth in more detail below.

In one embodiment, the history of the moves is stored locally on each of the nodes. In another embodiment, the history of the moves can be separately stored to a block chain for verification. If the block chain is used, the nodes playing the game can access the block chain to verify integrity of the history data. The history can also be stored on the block chain after a game session, and retrieved for later play if a new session is started. This allows for continued game play, while ensuring integrity of the data stored to the history. Thus, players will trust the data. The history also can be stored to the block chain periodically, to ensure integrity of the data during a long gaming session, as some gaming sessions can last hours, days, or even months.

In the method for processing a serverless video game, a further method operation includes generating, at the first node, a first move, and responsive to the first move sending to the second node a message regarding the first move, such that the second node is configured to receive the message regarding the first move by the first node. The consensus algorithm at the second node is configured to validate or invalidate the first move. In one embodiment, the messages are lightweight protocols that need only node addresses, to enable quick exchanges of data, which can include, by way of example, state data for results or data regarding moves. The method also includes the method operation of receiving, by the first node from the second node, a confirmation message regarding validity or invalidity of the first move by the first node.

Those skilled in the art will appreciate that any number of nodes can be included in play of the serverless video game. Thus, the method also can include a method operation that includes enabling joining of additional nodes for playing the serverless video game. In one embodiment, each of the joining nodes is configured to execute a respective consensus algorithm for verifying moves of other nodes. In addition, the history of the game can be transferred to each joining node, with the history being stored locally on each of the databases of each of the nodes.

FIG. 1 is a simplified schematic diagram illustrating an example discovery process by which a peer-to-peer zero-knowledge proof (ZKP) game is established, in accordance with one embodiment. As shown in FIG. 1, each of nodes 100-1 (Node 1), 100-2 (Node 2), 100-3 (Node 3), 100-4 (Node 4), and 100-N (Node N) has obtained a copy of a suitable ZKP game, e.g., "Game C." In one embodiment, the nodes obtain a copy the ZKP game from server 102. For example, as shown in FIG. 1, Node 1 contacted server 102 to obtain a game and was directed toward a list of available games including Games A to N. In one embodiment, the available games are displayed in an app store format, which can include a link to financial payment options for use during game play. In the example, Node 1 selected "Game C" from the list of available games, as indicated by the dashed arrow in FIG. 1, and this game was downloaded to Node 1. Once the nodes have obtained a game from the server, the nodes do not have to go back to the server to play that game. Nodes 100-1, 100-2, 100-3, 100-4, and 100-N can be any suitable computing device, e.g., a laptop computer, a tablet computer, a smartphone, etc.

As is well known to those skilled in the art, to start a peer-to-peer game, each node must establish a peer-to-peer connection with the other nodes involved in the game. In the event the players seeking to start a game already know one another, the players can contact each other directly, e.g., by text message, email message, telephone, etc., to set up the initial handshake required to establish the peer-to-peer connection between the nodes. In the event a player does not know anyone else interested in playing the game, the player can engage in a discovery process to identify other players who might be interested in starting a game. For example, as shown in FIG. 1, node 100-1 (Node 1) can communicate with server 102 to determine other nodes on which "Game C" has been installed. In one example, the server 102 displays to node 100-1 a list of nodes on which "Game C" is installed. By selecting, e.g., clicking on, nodes in the list, node 100-1 can send requests to the selected nodes to initiate a peer-to-peer connection. Once peer-to-peer connections have been made between the nodes, the game, e.g., "Game C," can be started.

In one embodiment, the node discovery process can be expanded to include all potential nodes as verifiers, rather than just relying on the players in the game to verify the proofs. By way of example, everyone in the casino could be asked to participate as a verifier. This would avoid a potential "51% attack" where a user gets seated at a table for a game with a majority of malicious players who may be running a different copy of the consensus algorithm. One of the significant benefits of zero-knowledge proofs such as zk-SNARKs is that they are non-interactive, so hypothetically any verifier with a copy of the proof should be able to verify the proof.

Figure 2:
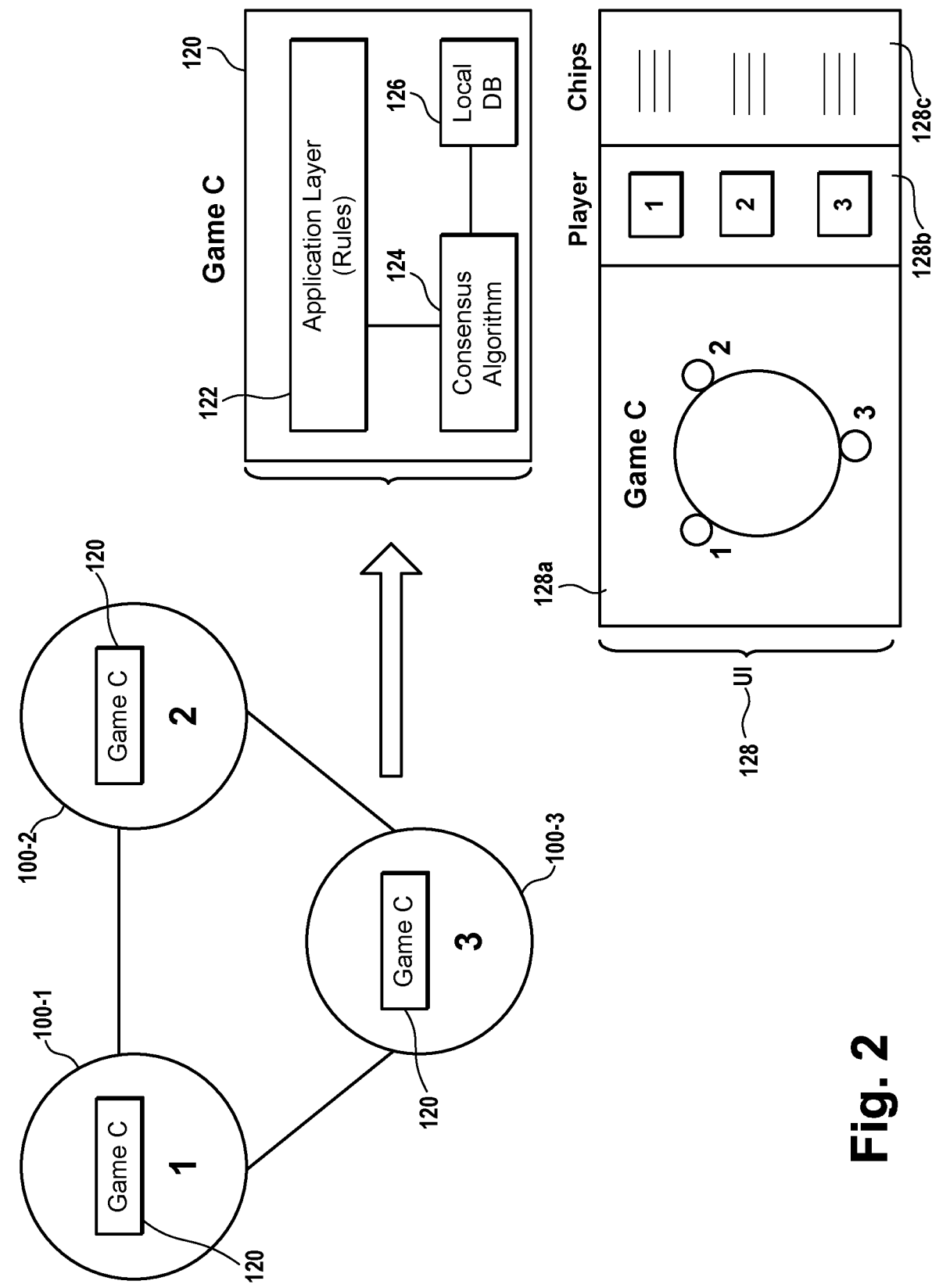
FIG. 2 is a simplified schematic diagram illustrating three nodes connected in a peer-to-peer network to play a zero-knowledge proof (ZKP) game, in accordance with one embodiment.

FIG. 2 is a simplified schematic diagram illustrating three nodes connected in a peer-to-peer network to play a zero-knowledge proof (ZKP) game, in accordance with one embodiment. As shown in FIG. 2, nodes 100-1, 100-2, and 100-3 are connected in a peer-to-peer network. Those skilled in the art are familiar with suitable techniques for connecting the nodes to establish a peer-to-peer network. Each of nodes 100-1, 100-2, and 100-3 has a ZKP game 120, e.g., "Game C," installed thereon. ZKP game 120 includes an application layer 122, a consensus algorithm 124, and a local database 126. Application layer 122 includes the logic and rules required to play a particular game. In one example in which "Game C" is an online poker game, the application layer 122 will include, among other functionality, the logic and rules, e.g., number of cards to be dealt, number of cards to be exchanged, rankings (based on cards in hand), etc., required to play online poker.

Consensus algorithm 124 is provided to enable the individual nodes to obtain consensus while maintaining privacy. In the context of an online poker game, the consensus algorithm 124 enables the individual nodes to verify that the game is being played fairly and to determine the winner of each hand without revealing any information regarding a player's hand to the other nodes. In one embodiment, the consensus algorithm 124 is implemented using zero-knowledge proofs (ZKPs). By way of example, one suitable form of ZKPs is known as zk-SNARKs, which stands for "Zero-Knowledge Succinct Non-Interactive Argument of Knowledge," and refers to a proof construction in which a prover can prove possession of certain information to a verifier without revealing that information, and without any interaction between the prover and the verifier. In example embodiments, various ways are possible for constructing the proofs used by the consensus algorithm, and various ways are possible for processing the interaction model between the verifier and the prover. Additional details regarding the consensus algorithm will be discussed in detail below.

Still referring to FIG. 2, consensus algorithm 124 is in communication with local database 126, which is built by recording all the transactions involving the node. As such, the local database 126 is essentially a copy of the contents of a block chain that stores history for the node. The history may include transactions that occurred over time and those transactions may be used by the consensus algorithm in the verification process. The block chain can be a public database. The public database may be one as used by, for example, bitcoin for storing data that can be trusted. The trust in block chain databases is based on the nature of the algorithm processed when each successive entry is made. These algorithms are sometimes referred to as mining algorithms, which must compute entries for new data being stored, which relies on computations of all prior entries. The block chain, in one embodiment, may be accessed by one or all of the nodes after each transaction, e.g., game move or action, or may be accessed periodically to do batch savings to the block chain, which is remote from each of the nodes. By way of example, the block chain may be accessed by each node using messaging or packet transmission over the internet or any wired or wireless network. In cases where it is not necessary to replay the whole block chain history, bootstraps can be used.

ZKP game 120 also includes a user interface 128 for displaying pertinent information to a user. As shown in FIG. 2, user interface 128 is configured for an online poker game and includes user interface (UI) sections 128a, 128b, and 128c. Section 128a shows a simplified view of the poker game including players 1, 2, and 3 and displays all of the publicly available information regarding the game to the user. UI section 128a also is configured to enable the player to make appropriate game moves during the course of the game, e.g., making bets, discarding cards, folding, etc. UI section 128b identifies each of the players participating in the game, e.g., player 1, player 2, and player 3. If desired, either in addition to or instead of being identified by player number, the players can be associated with an avatar, icon, or other identifying symbol. UI section 128c displays the value of the chips currently being held by each player. It will be apparent to those skilled in the art that user interface 128 shown in FIG. 2 can be modified as needed to enable games other than online poker to be played.

Figure 3:
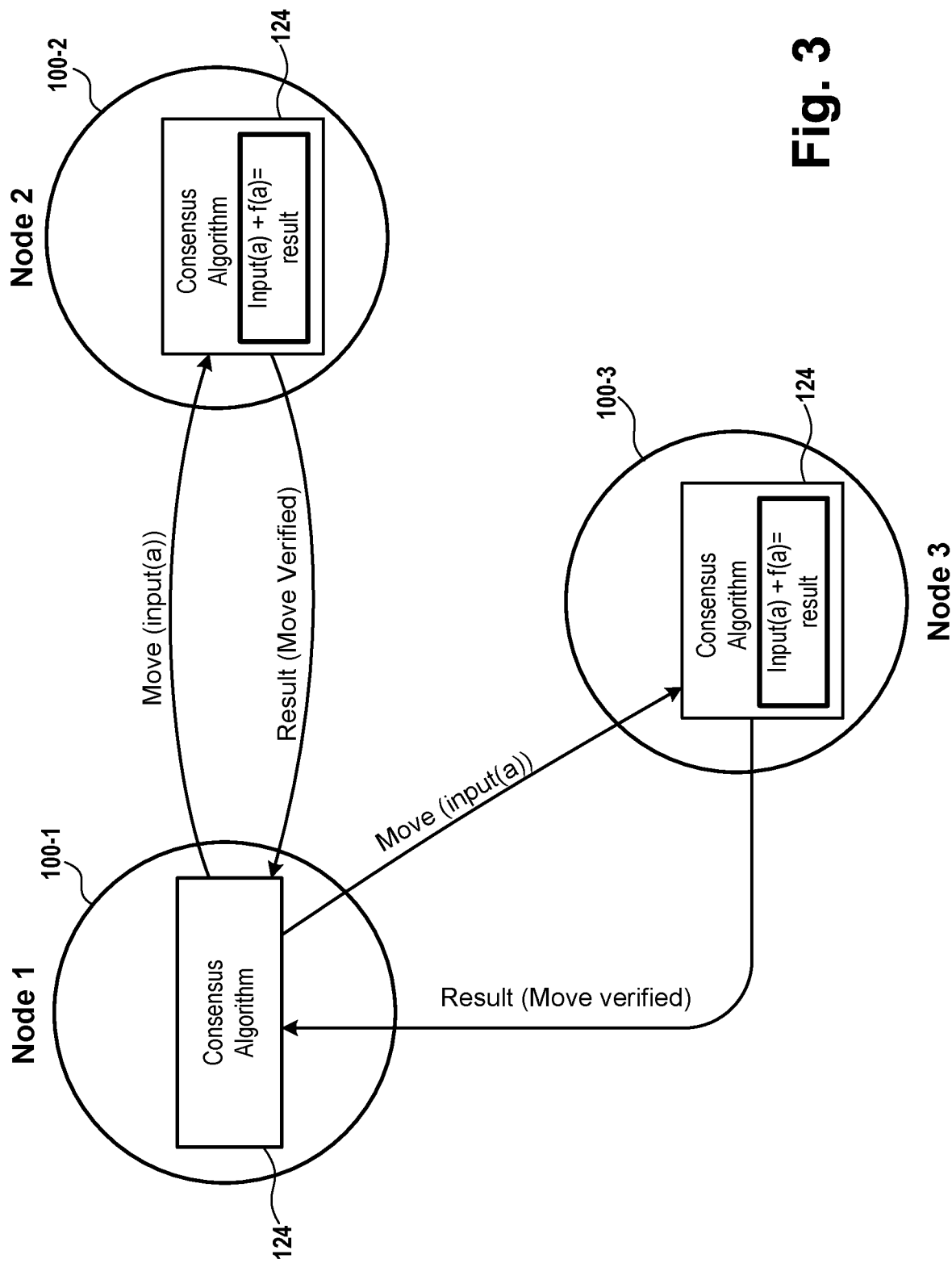
Figure 4:
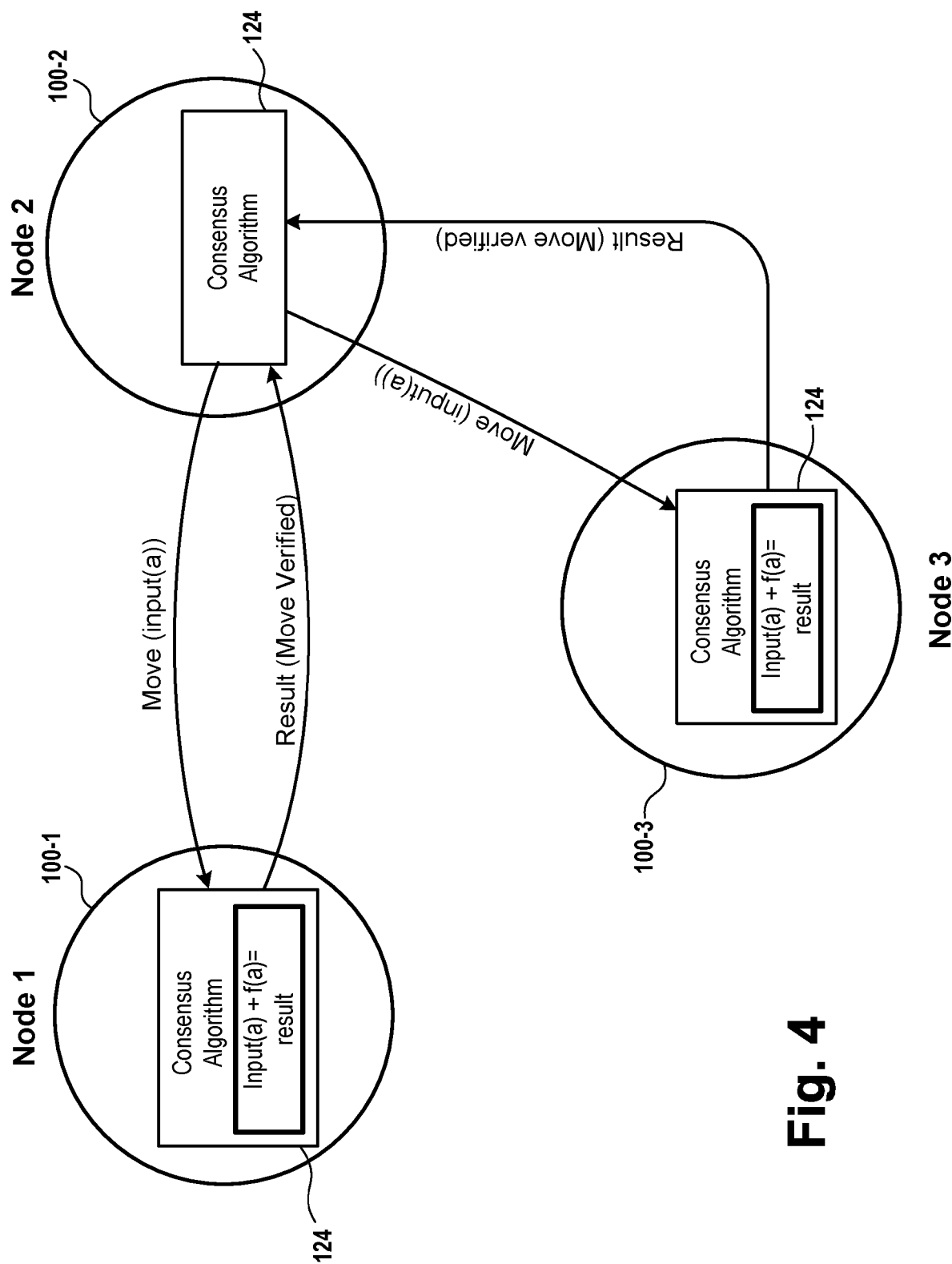
Figures 4, 7:
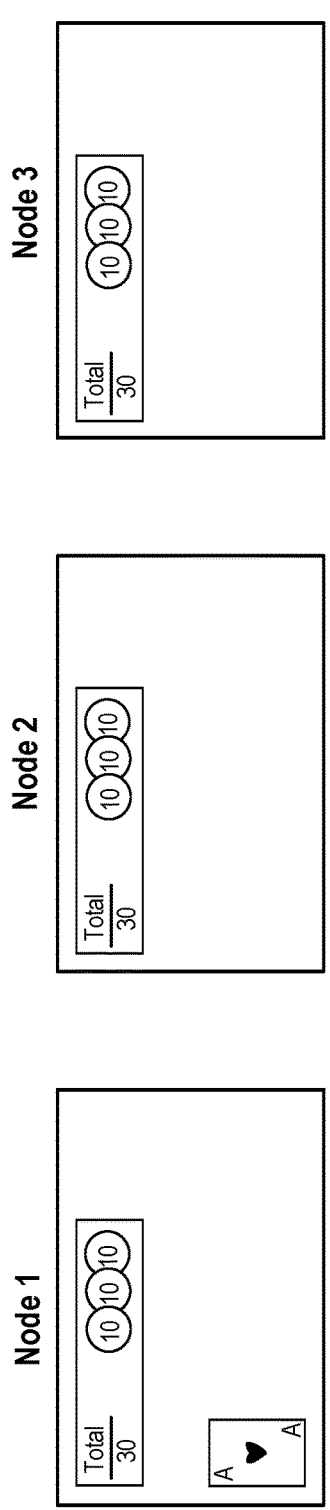
Figures 5, 7:
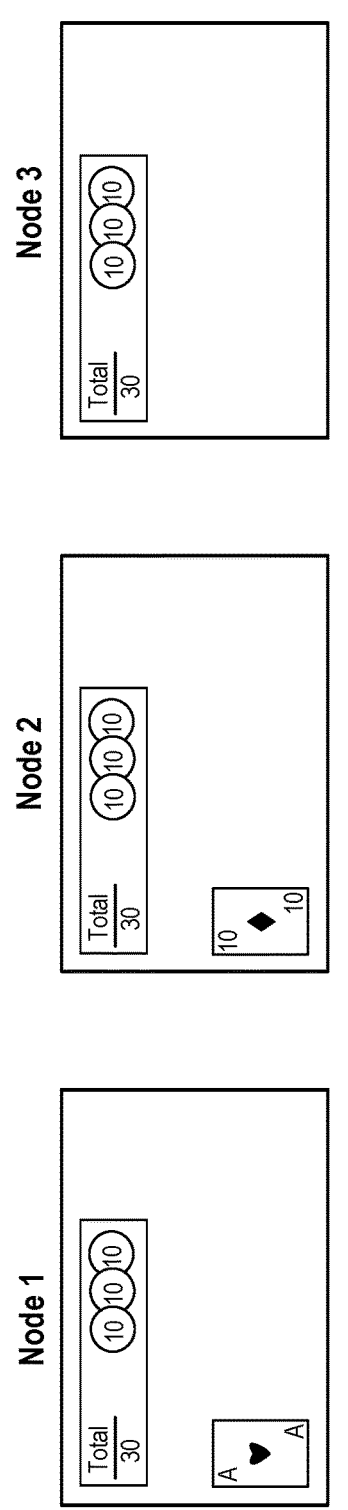

FIGS. 3-5 are simplified schematic diagrams that illustrate how the nodes involved in a game communicate with each other when a game move is made and verify that the game move is proper, in accordance with one embodiment. As shown in FIG. 3, node 100-1 (Node 1) has just made a game move in an online poker game, e.g., Node 1 has dealt a card, e.g., the ten of clubs, to player 1 (the player at Node 1). The consensus algorithm 124 of Node 1, which received the game move from application layer 122 of Node 1 (see FIG. 2), transmits the game move to each of nodes 100-2 (Node 2) and 100-3 (Node 3) in the form of an input (a) for an anonymized function f(a), which is part of a zero-knowledge proof. The anonymized function f(a) applies the input to the constraints of the game, e.g., number and type of cards in a deck, number of cards each player gets, player still in game (has not folded), etc., and returns a true/false result. A zero-knowledge proof is similar to a circuit in that it is either "on" (true) or "off" (false). Thus, if all of the constraints are satisfied, then the circuit is "on" and the result is valid. Accordingly, the return from the anonymized function f(a) will be "true." If one or more of the constraints are not satisfied, then the circuit is "off" and the result is invalid. In this case, the return from the anonymized function f(a) will be "false."

In the example in which Node 1 has dealt a card, e.g., the ten of clubs, to player 1, the respective consensus algorithms 124 of Node 2 and Node 3 will verify the move as being proper unless it does not satisfy one or more constraints of the game. For example, if player 1 had already received his full allotment of cards, then the move would be improper. Similarly, if the ten of clubs had already been dealt to another player, then the move would be improper. If no consensus is reached by the respective consensus algorithms of the nodes regarding a game move, it is likely that the game has been infiltrated by a "bad actor" and corrective action will need to be taken. In one embodiment, the game can be terminated and the players can be given refunds for any proceeds expended during the game.

As shown in FIG. 4, node 100-2 (Node 2) has just made a game move in an online poker game, e.g., Node 2 has dealt a card, e.g., the three of hearts, to player 2. The consensus algorithm 124 of Node 2, which received the game move from application layer 122 of node 2 (see FIG. 2), transmits the game move to each of nodes 100-1 (Node 1) and 100-3 (Node 3) in the form of an input (a) for an anonymized function f(a), which is part of a zero-knowledge proof. The respective consensus algorithms 124 of Node 1 and Node 3 will verify the move as being proper unless it does not satisfy one or more constraints of the game, as described above. Once the move has been verified as being proper, the game proceeds to the next move.

As shown in FIG. 5, node 100-3 (Node 3) has just made a game move in an online poker game, e.g., node 3 has dealt a card, e.g., the queen of diamonds, to player 3. The consensus algorithm 124 of Node 3, which received the game move from application layer 122 of Node 3 (see FIG. 2), transmits the game move to each of nodes 100-1 (Node 1) and 100-2 (Node 2) in the form of an input (a) for an anonymized function f(a), which is part of a zero-knowledge proof. The respective consensus algorithms 124 of Node 1 and Node 2 will verify the move as being proper unless it does not satisfy one or more constraints of the game, as described above. Once the move has been verified as being proper, the game proceeds to the next move.

The communications between the respective consensus algorithms 124 of nodes 100-1 (Node 1), 100-2 (Node 2), and 100-3 (Node 3) illustrated in FIGS. 3-5 are encrypted. Those skilled in the art are familiar with suitable techniques for implementing encrypted communication between the nodes. By way of example, the encrypted communication between the nodes can be implemented using public key infrastructure (PKI) in which public and private key pairs are used for encryption and decryption, respectively. Additionally, the consensus algorithms 124 of the nodes are configured to keep non-public information hidden from users. For instance, in the example in which Node 1 deals the ten of clubs to player 1, player 1 will, of course, be able to see that she has been dealt the ten of clubs by looking at the UI 128 (see FIG. 2) displayed at Node 1. The other players, i.e., players 2 and 3 in this example, will not be able to see that player 1 has been dealt the ten of clubs. Nor will players 2 and 3 be able to see any of the other cards in player 1's hand. Thus, with this configuration, each player will be able to see the cards in her own hand, but will not be able to see (or otherwise access) the cards in the other player's hands.

Figures 6, 7:
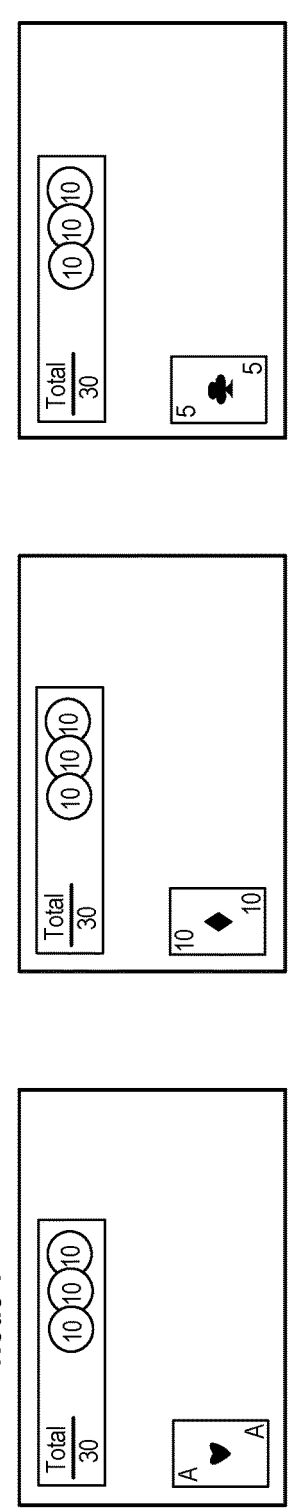
Figure 7:
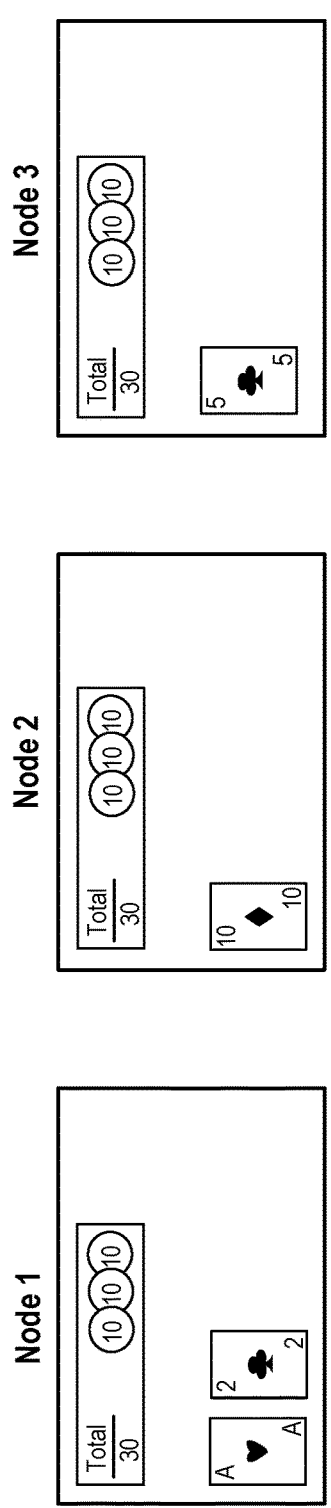

FIG. 6 is a table showing the game moves made in an example ZKP game of online poker. In this example, the ZKP game includes three players (Nodes 1-3) and the type of poker being played is 5-card draw. In game moves 1-3, each of the players makes his or her ante. As described above in connection with FIGS. 3-5, after each move is made, the node making the move communicates the move to the other two nodes so that the other nodes can verify that the move is proper. With regard to the ante, the consensus algorithms of the nodes would verify, for example, that the amount of the ante is proper and the player making the ante has sufficient funds, e.g., chips, to make the ante. In game moves 4-18, the players are each dealt five cards, one at a time, in alternating fashion. Again, after each move is made, the node making the move communicates the move to the other two nodes so that the other nodes can verify that the move is proper. With regard to the dealing of the cards, the consensus algorithms of the nodes would verify, for example, that the card being dealt to a player has not already been dealt to another player, that the card falls within the parameters of a standard 52-card deck, and the player has not exceeded his or her allotment of five cards. Assuming that each of game moves 4-18 is verified as being proper, the game proceeds to the first betting round.

In game moves 19-21, each of the players makes his or bet in the first betting round. After each bet, the node making the bet communicates the bet to the other two nodes so that the other nodes can verify that the bet is proper. With regard to betting, the consensus algorithms of the nodes would verify, for example, that amount being bet is within the limits of the game and that the player making the bet has sufficient funds, e.g., chips, to make the bet. In game moves 22-24, the draw phase of the game occurs. In the draw phase, each player specifies how many cards they wish to replace and discards those cards. The players are dealt, in turn, the same number of cards they discarded so that each player again has five cards in his or her hand. After each move in the draw phase, the node making the move communicates the move to the other two nodes so that the other nodes can verify that the move is proper. With regard to the draw phase, the consensus algorithms would verify, for example, that the number of cards being discarded is proper (the rules of 5-card draw typically allow only three cards to be discarded), that the number of cards being dealt to a player is proper, and the cards being dealt are proper (e.g., have not already been dealt to another player and fall within the parameters of a standard 52-card deck). Assuming that each of game moves 22-24 is verified as being proper, the game proceeds to the second (and final) betting round.

In game moves 25-27, each of the players makes his or bet in the second (and final) betting round. After each bet, the node making the bet communicates the bet to the other two nodes so that the other nodes can verify that the bet is proper. As described above, the consensus algorithms of the nodes would verify, for example, that amount being bet is within the limits of the game and that the player making the bet has sufficient funds, e.g., chips, to make the bet. Once the second round bets have been made and verified by the consensus algorithms of the respective nodes, the game proceeds to a showdown in which the player with the best hand wins the pot.

The showdown to determine the winner of the hand is implemented by the consensus algorithms of the respective nodes. The consensus algorithms get the pertinent inputs regarding the game, e.g., the cards in each player's hand and the amount each player bet, run the constraints of the game, e.g., the rules of the game including the ranking of hands, whether a player has either folded or made bets, etc., and return a true/false result to each player as to which hand won. By way of example, in a game in which player 1 had a flush (all cards of the same suit), player 2 had a pair of aces, and player 3 had a 10-high straight (10-9-8-7-6 of different suits), the consensus algorithm of Node 1, which corresponds to player 1, would determine that player 1 was the winner because she had the best hand (a flush is ranked higher than both a straight and a pair of aces). Accordingly, the consensus algorithm of Node 1 would cause a "true" result to be displayed on the user interface of that node. By way of example, the "true" result could be presented in the form of a message that says "Congratulations, you won!" or "Winner!" If desired, the message could also include the amount that the player won.

On the other hand, the consensus algorithm of Node 2, which corresponds to player 2, would determine that player 2 did not win and the consensus algorithm of Node 3, which corresponds to player 3, would determine that player 3 did not win. Thus, the consensus algorithm of Node 2 would cause a "false" result to be displayed on the user interface of that node. Likewise, the consensus algorithm of Node 3 would cause a "false" result to be displayed on the user interface of that node. By way of example, the "false" result for each of the losing players could be presented in the form of a message that says "Sorry, you lost." For both "true" and "false" results, the players are not provided with any information regarding what cards were in the other player's hands.

FIGS. 7-1 to 7-28 are a series of drawings which illustrate the information displayed by the respective user interfaces for the nodes during an example ZKP game of online poker. The moves illustrated in FIGS. 7-1 to 7-28 track the game moves listed in the table shown in FIG. 6 for the example ZKP game of 5-card draw with three players (Nodes 1-3). As shown in FIG. 7-1, when player 1 makes his ante of 10 units, each of the respective user interfaces for Nodes 1-3 is updated to reflect that that the total amount bet in the hand is 10 units. As players 2 and 3 sequentially make their antes of 10 units, the respective user interfaces for Nodes 1-3 are updated to reflect the total amount bet in the hand increases from 10 units to 20 units (FIG. 7-2) and then to 30 units (FIG. 7-3).

In game moves 4-18, each of players 1-3 is dealt a hand of five cards, one at a time, in alternating fashion. In game move 4, Node 1 deals the ace of hearts to player 1. As shown in FIG. 7-4, the user interface for Node 1 is updated to display the ace of hearts to player 1, but the respective user interfaces for Nodes 2 and 3 are not updated to display this card so that players 2 and 3 cannot see what cards are in player 1's hand. In game move 5, Node 2 deals the ten of diamonds to player 2. As shown in FIG. 7-5, the user interface for Node 2 is updated to display the ten of diamonds to player 2, but the respective user interfaces for Nodes 1 and 3 are not updated to display this card so that players 1 and 3 cannot see what cards are in player 2's hand. In game move 6, Node 3 deals the five of clubs to player 3. As shown in FIG. 7-6, the user interface for Node 3 is updated to display the five of clubs to player 3, but the respective user interfaces for Nodes 1 and 2 are not updated to display this card so that players 1 and 2 cannot see what cards are in player 3's hand. The dealing process continues in game moves 7-18 and the corresponding updates of the user interfaces for Nodes 1-3 are shown in FIGS. 7-7 to 7-18, respectively. Once game move 18 is completed, each of players 1-3 has five cards in his or her hand.

As described above with reference to FIG. 6, the first betting round occurs in game moves 19-21. In game move 19, player 1 makes a bet of 50 units. As shown in FIG. 7-19, when player 1 makes his bet of 50 units, each of the respective user interfaces for Nodes 1-3 is updated to reflect that that the total amount bet in the hand is 80 units. In game move 20, player 2 calls player 1's bet of 50 units. Thus, as shown in FIG. 7-20, each of the respective user interfaces for Nodes 1-3 is updated to reflect that that the total amount bet in the hand is 130 units. In game move 21, player 3 also calls player 1's bet of 50 units. Thus, as shown in FIG. 7-21, each of the respective user interfaces for Nodes 1-3 is updated to reflect that that the total amount bet in the hand is 180 units.

In game moves 22-24, the draw phase of the game occurs. In game move 22, player 1 discarded three cards (the two of clubs, the six of spades, and the three of spades) and Node 1 dealt three new cards to player 1. As shown in FIG. 7-22, the user interface for Node 1 is updated to display to player 1 his final hand, which includes the ace of diamonds, the ten of clubs, the seven of clubs, the king of hearts, and the seven of hearts. In game move 23, player 2 discarded one card (the three of hearts) and Node 2 dealt a new card to player 2. As shown in FIG. 7-23, the user interface for Node 2 is updated to display to player 2 her final hand, which includes the ten of diamonds, the seven of diamonds, the ten of hearts, the queen of diamonds, and the king of diamonds. In game move 24, player 3 discarded two cards (the five of clubs and the eight of hearts) and Node 3 dealt two new cards to player 3. As shown in FIG. 7-24, the user interface for Node 3 is updated to display to player 3 his final hand, which includes the jack of hearts, the nine of diamonds, the jack of diamonds, the queen of spades, and the king of clubs.

The second (and final) betting round occurs in game moves 25-27. In game move 25, player 1 makes a bet of 100 units. As shown in FIG. 7-25, when player 1 makes his bet of 100 units, each of the respective user interfaces for Nodes 1-3 is updated to reflect that that the total amount bet in the hand is 280 units. In game move 26, player 2 calls player 1's bet of 100 units. Thus, as shown in FIG. 7-26, each of the respective user interfaces for Nodes 1-3 is updated to reflect that that the total amount bet in the hand is 380 units. In game move 27, player 3 also calls player 1's bet of 100 units. Thus, as shown in FIG. 7-27, each of the respective user interfaces for Nodes 1-3 is updated to reflect that that the total amount bet in the hand is 480 units.

Once the second round bets have been made, the game proceeds to a showdown in which the player with the best hand wins the pot. As described above with reference to FIG. 6, the consensus algorithms of the nodes get the pertinent inputs regarding the game, e.g., the cards in each player's hand and the amount each player bet, run the constraints of the game, e.g., the rules of the game including the ranking of hands, whether a player has either folded or made bets, etc., and return a true/false result to each player as to which hand won. In the example of FIG. 7, player 1 has a pair of sevens, player 2 has a pair of tens, and player 3 has a pair of jacks. The consensus algorithm of Node 3, which corresponds to player 3, would determine that player 3 was the winner because he had the best hand (a pair of jacks beats both a pair of tens and a pair of sevens). Thus, as shown in FIG. 7-28, the consensus algorithm of Node 3 would cause the message "Winner!" to be displayed on the user interface of that node. On the other hand, the consensus algorithm of Node 1, which corresponds to player 1, would determine that player 1 did not win and the consensus algorithm of Node 2, which corresponds to player 2, would determine that player 2 did not win. Thus, as shown in FIG. 7-28, the consensus algorithms of Nodes 1 and 2 would cause the message "Sorry, you lost" to be displayed on the respective user interfaces of those nodes.

Figures 7, 8:
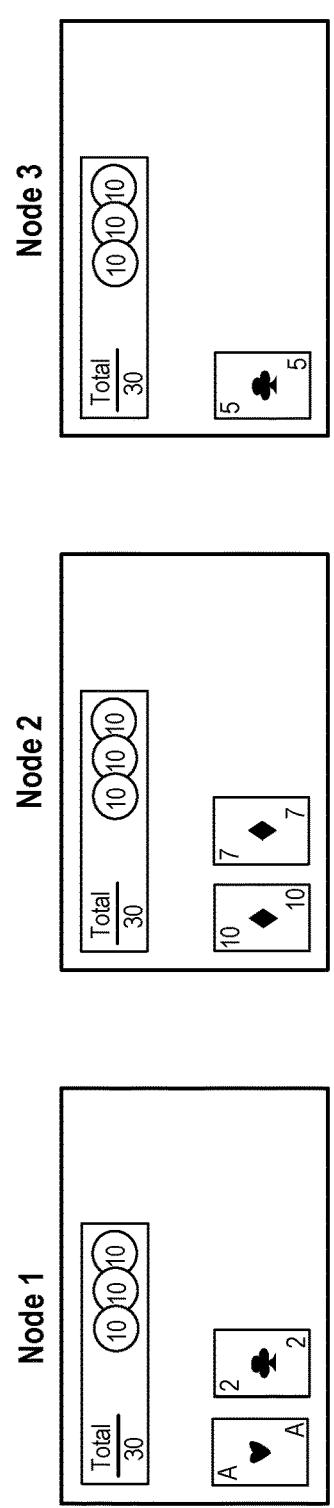

FIG. 8 is a simplified schematic diagram illustrating the process by which a new player can join a ZKP game, in accordance with one embodiment. As shown in FIG. 8, nodes 100-1 (Node 1), 100-2 (Node 2), and 100-3 (Node 3) are connected in a peer-to-peer network to play a ZKP game with three players (players 1-3). As described above with reference to, for example, FIGS. 3-5, the nodes communicate with one another via, e.g., simple messages, encrypted messages, etc., when game moves are made by a node so that the consensus algorithms 124 of the other nodes can verify that the game actions are proper. The messages between the nodes can be sent using any suitable messaging protocol, and different messaging protocols can be used. By way of example, the messages between Nodes 1 and 2 can be sent using one protocol, e.g., transmission control protocol (TCP), and the messages between Nodes 1 and 3 and the messages between Nodes 2 and 3 can be sent using another protocol, e.g., uniform datagram protocol (UDP).

In the event a fourth player at node 100-4 (Node 4) seeks to join the game, Node 4 would receive the transactions that have taken place so far in the game from each of Nodes 1-3, as indicated by the dashed lines shown in FIG. 8. As described in more detail above, the transactions are stored in the local database 126 of each node. Through review of the transactions, Node 4 would be able to ascertain the status of the game between players 1-3. By way of example, upon reviewing the transactions, Node 4 might determine that players 1-3 have played 100 hands and that player 1 is likely the best player because he currently has the most chips in the game. To obtain funds to use in the game, player 4 (Node 4) can use any suitable financial technology ("fintech") solution. For example, player 4 can obtain funds using a digital wallet (also known as an "e-Wallet"), which can be linked to a bank account or into which money can be deposited prior to any transaction. In addition, player 4 can obtain funds using a cryptocurrency wallet, which is a digital wallet where private keys are stored for cryptocurrencies such as bitcoin, ethereum, Zcash, etc. The consensus algorithms of the other nodes can be used to verify that player 4 has sufficient funds to cover the amount being used in the game and that player 4's funds are from a legitimate source. In another embodiment, one or more of the other nodes can transfer funds to player 4 or otherwise obtain funds for player 4.

In the examples described above, methods for processing a serverless video game have been described in the context of an online poker game. Those skilled in the art will appreciate that the methods for processing a serverless video game can be used to implement other video games. Additionally, the methods for processing a serverless video game can be used to facilitate actions within video games including, by way of example, auctions, trading, distribution of loot boxes, in-game currency, gambling, etc. Embodiments using zero-knowledge proofs (ZKPs) enable consensus and/or finality to be achieved in a serverless game because ZKPs put the power in an objective verifier rather than leaving it in the hands of a centralized server, which can be hacked or gamed. Consequently, users can buy, sell, or trade items in an online video game without risk of scam or malice.

Figures 7, 8, 9:
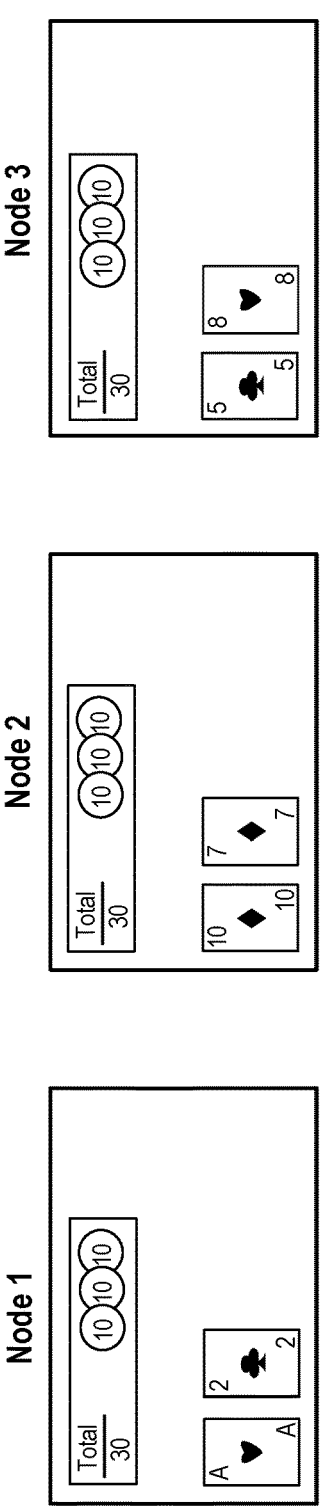
Figures 7, 8, 9, 10, 11, 12, 13, 14, 15, 16:
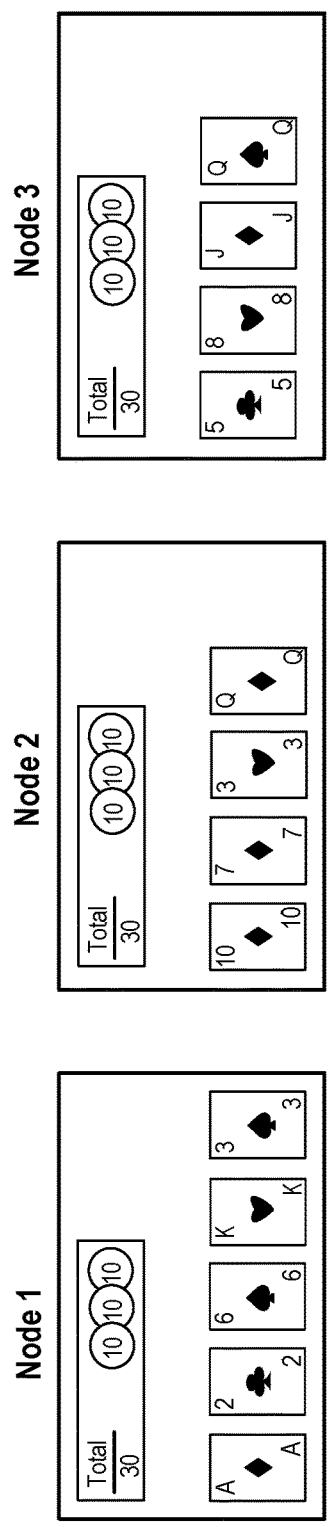
Figures 7, 8, 9, 10, 11, 12, 13, 14, 15, 16, 17:
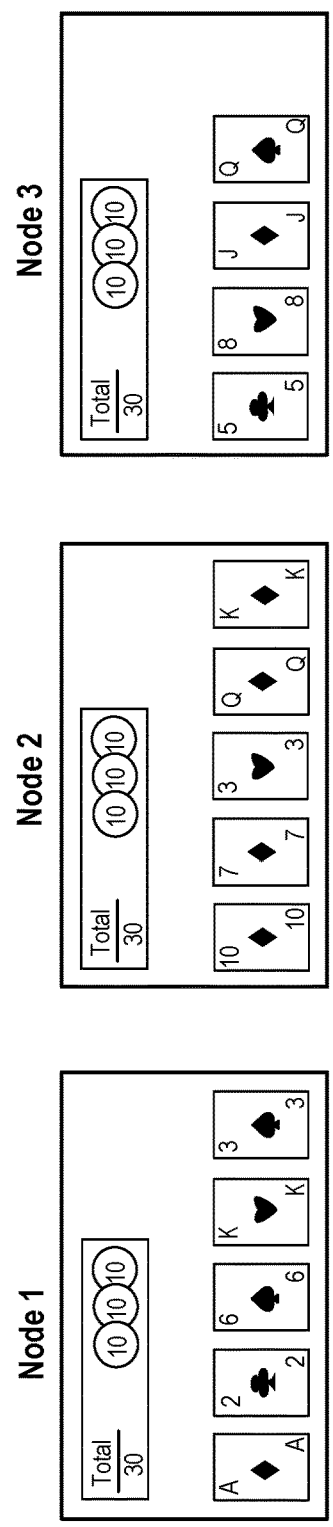
Figures 7, 8, 9, 10, 11, 12, 13, 14, 15, 16, 17, 18:
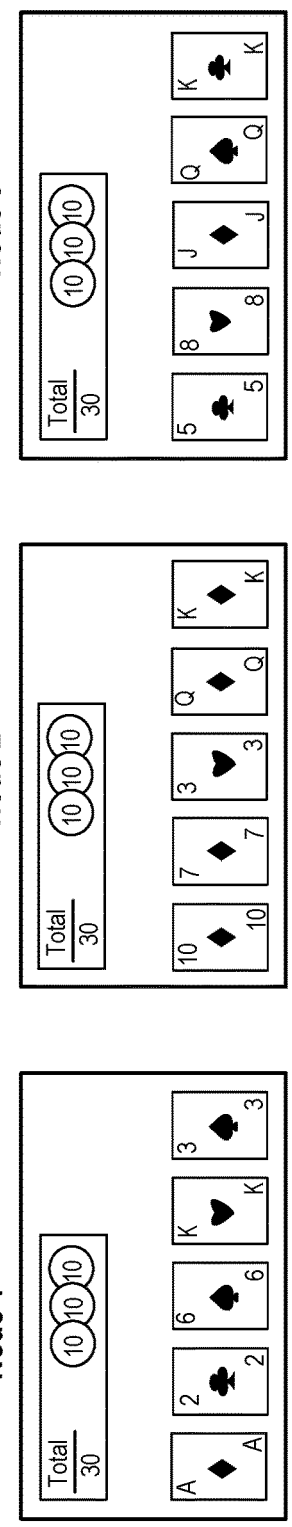
Figures 7, 8, 9, 10, 11, 12, 13, 14, 15, 16, 17, 18, 19:
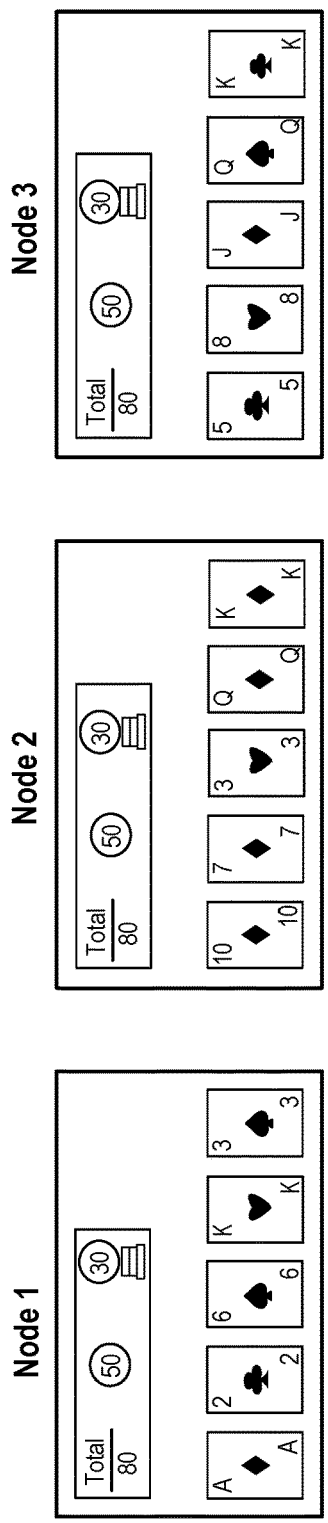
Figures 7, 8, 9, 10, 11, 12, 13, 14, 15, 16, 17, 18, 19, 20:
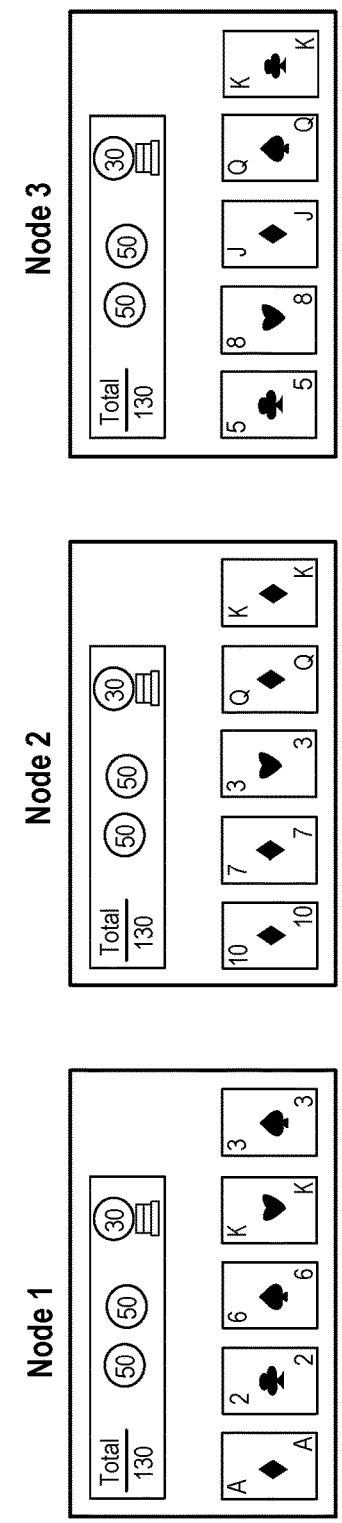
Figures 7, 8, 9, 10, 11, 12, 13, 14, 15, 16, 17, 18, 19, 20, 21:
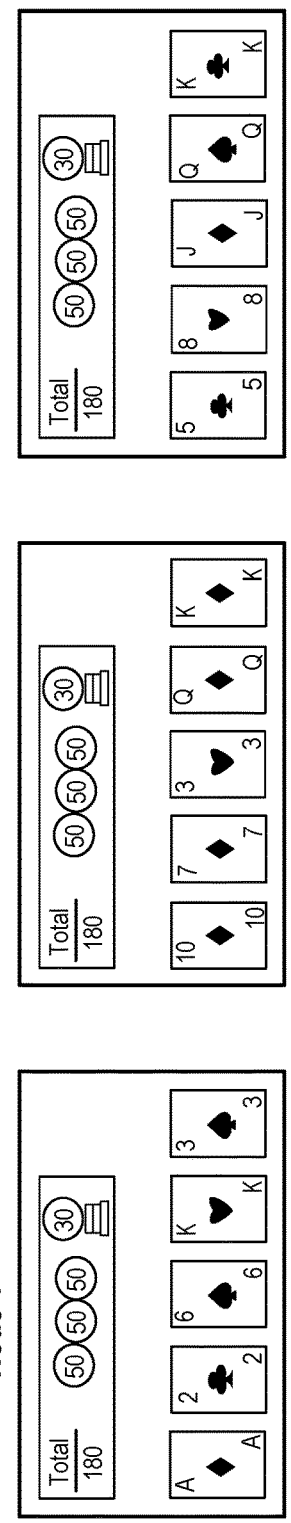
Figures 7, 8, 9, 10, 11, 12, 13, 14, 15, 16, 17, 18, 19, 20, 21, 22, 23, 24, 25:
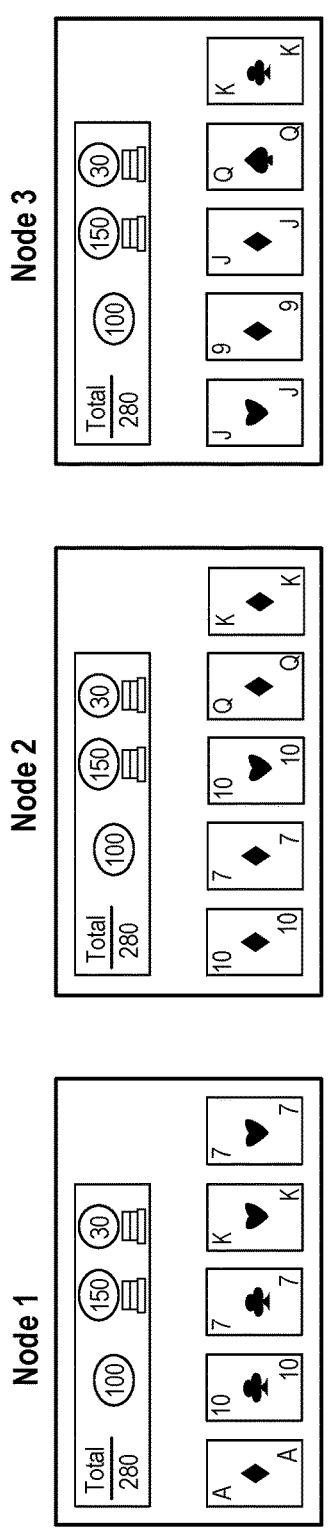
Figures 7, 8, 9, 10, 11, 12, 13, 14, 15, 16, 17, 18, 19, 20, 21, 22, 23, 24, 25, 26:
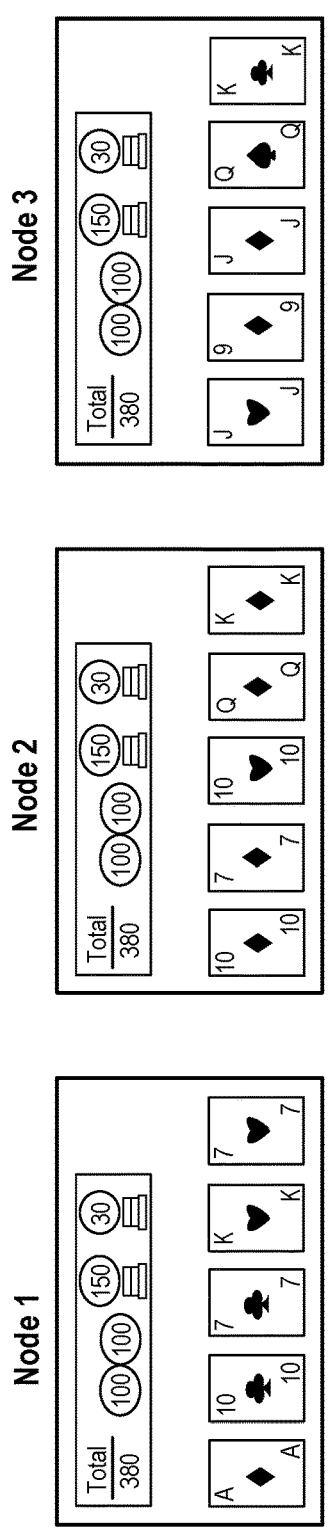
Figures 7, 8, 9, 10, 11, 12, 13, 14, 15, 16, 17, 18, 19, 20, 21, 22, 23, 24, 25, 26, 27:
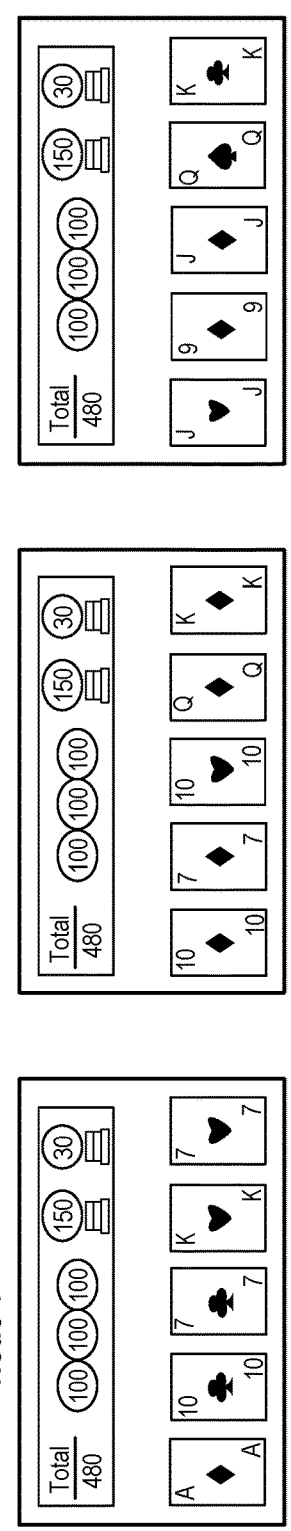
Figures 7, 8, 9, 10, 11, 12, 13, 14, 15, 16, 17, 18, 19, 20, 21, 22, 23, 24, 25, 26, 27, 28:
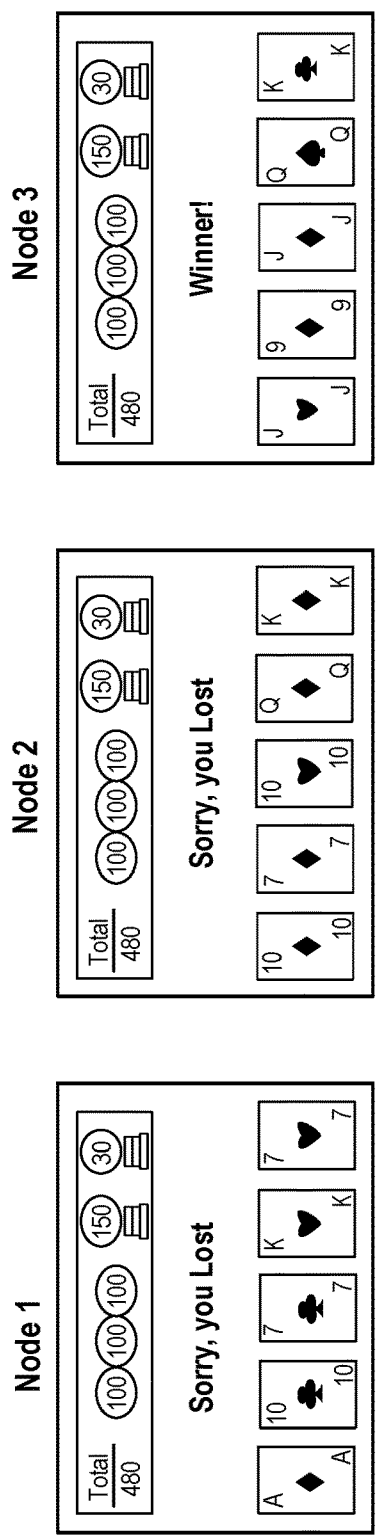
Figure 8:
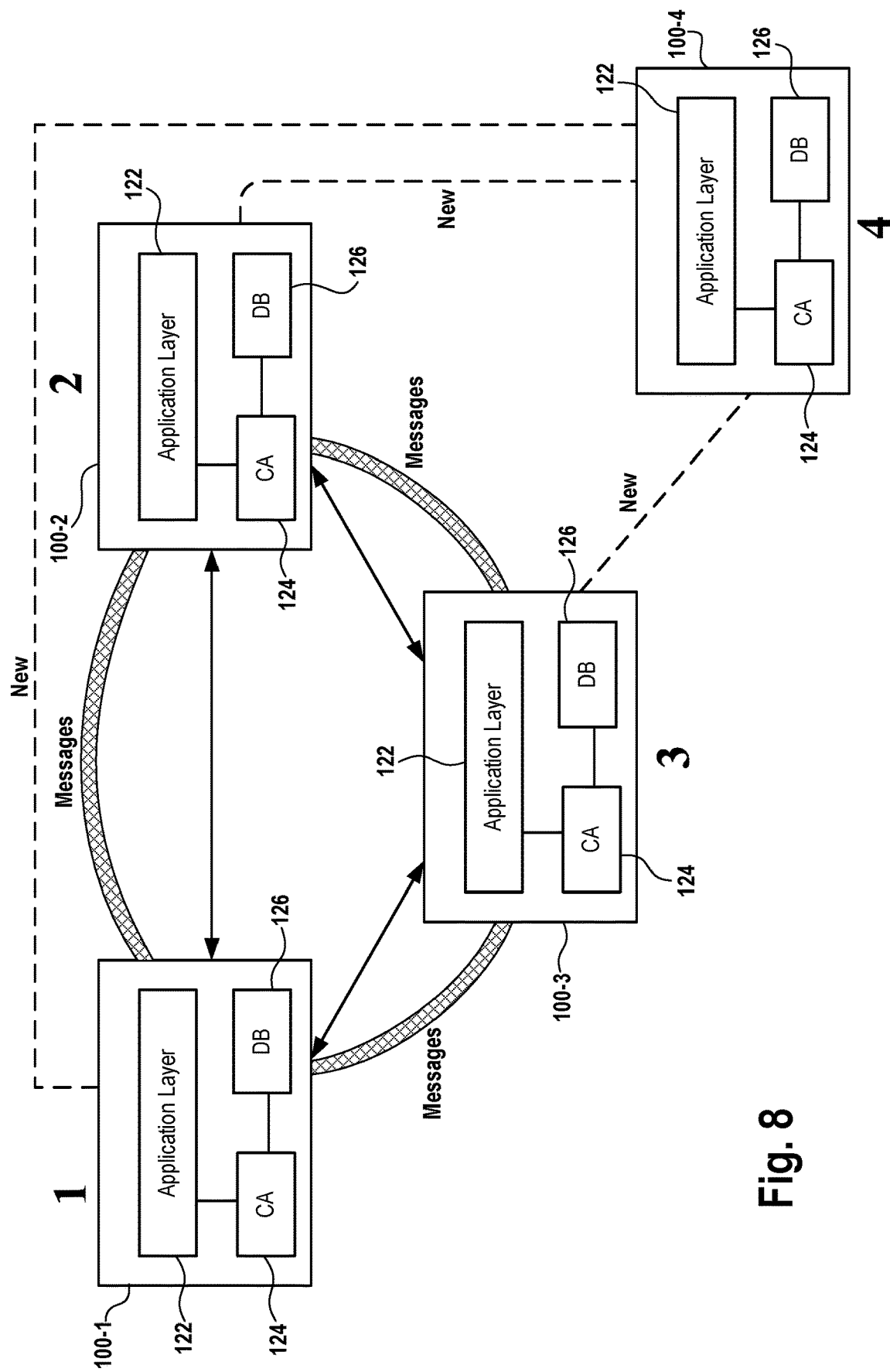
Figure 9:
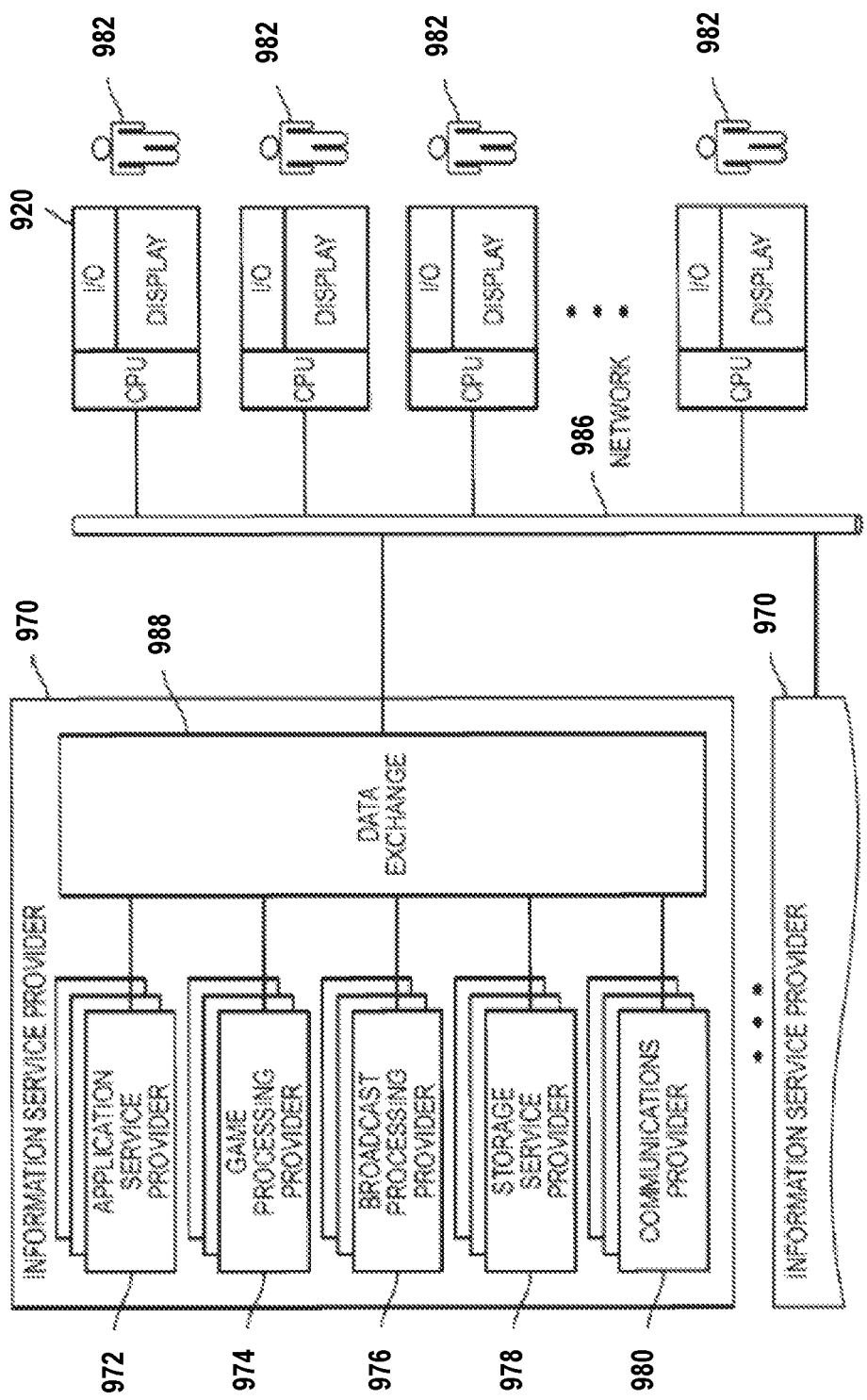

FIG. 9 illustrates an embodiment of an Information Service Provider architecture. Information Service Provider (ISP) 970 delivers a multitude of information services to users 982 geographically dispersed and connected via network 986. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 970 includes Application Service Provider (ASP) 972, which provides computer-based services to customers over a network (e.g., including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the internet (e.g., using servers, storage and logic), based on how the internet is depicted in computer network diagrams and is an abstraction for the complex infrastructure it conceals.

Further, ISP 970 includes a Game Processing Server (GPS) 974 which is used by game clients to play single and multiplayer video games. Most video games played over the internet operate via a connection to a game server. Typically, games use a dedicated server application that collects data from players and distributes it to other players. This requires a separate server to host the server application. In another embodiment, the GPS establishes communication between the players and their respective game-playing devices exchange information without relying on the centralized GPS. In yet another embodiment, the GPS can be used to distribute game copies to nodes via download and to facilitate a discovery process by which nodes can initiate a peer-to-peer connection with other nodes interested in playing a game in a serverless environment.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 976 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 978 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 980 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service Provider (NSP) which sells bandwidth or network access by providing direct backbone access to the Internet. Network service providers include telecommunications companies, data carriers, wireless communications providers, Internet service providers, cable television operators offering high-speed internet access, etc.

Data Exchange 988 interconnects the several modules inside ISP 970 and connects these modules to users 982 via network 986. Data Exchange 988 can cover a small area where all the modules of ISP 970 are in close proximity, or can cover a large geographic area when the different modules are geographically dispersed. For example, Data Exchange 988 can include a fast Gigabit Ethernet (or faster) within a cabinet of a data center, or an intercontinental virtual area network (VLAN).

Users 982 access the remote services with client device 920, which includes at least a CPU, a memory, a display and I/O. The client device can be a PC, a mobile phone, a netbook, tablet, gaming system, a PDA, etc. In one embodiment, ISP 970 recognizes the type of device used by the client and adjusts the communication method employed. In other cases, client devices use a standard communications method, such as HTML, to access ISP 970.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although method operations may be described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Accordingly, the disclosure of the example embodiments is intended to be illustrative, but not limiting, of the scope of the disclosures, which are set forth in the following claims and their equivalents. Although example embodiments of the disclosures have been described in some detail for purposes of clarity of understanding, it will be apparent that certain changes and modifications can be practiced within the scope of the following claims. In the following claims, elements and/or steps do not imply any particular order of operation, unless explicitly stated in the claims or implicitly required by the disclosure.

What is claimed is:

1. A method for processing a serverless video game, comprising:
    generating, at a first node, a notification to a second node to join play of the serverless video game;
    confirming, by the first node, that the second node has joined to play the serverless video game, the joining by the second node creating a peer-to-peer communication process for executing an application layer for the serverless video game;
    executing, at each of the first node and the second node a consensus algorithm for verifying moves processed by the application layer that runs game rules for the serverless video game, wherein said consensus algorithm at each of the first node and the second node respectively maintains a database for storing a history of said moves by each one of the first and second nodes, and said consensus algorithm is configured to independently process at each of the first and second nodes said verifying of each of the moves;
    generating, at the first node, a first move, and responsive to the first move sending to the second node a message regarding the first move, such that the second node is configured to receive the message regarding the first move by the first node, wherein the consensus algorithm at the second node is configured to validate or invalidate the first move, and wherein an anonymized function of said consensus algorithm at the second node independently processes the first move against said game rules for said validating or invalidating of the first move; and
    receiving, by the first node from the second node, a confirmation message regarding validity or invalidity of the first move by the first node.

2. The method of claim 1, further comprising:
    enabling joining of additional nodes for playing the serverless video game, wherein each of the joining nodes is configured to execute a respective consensus algorithm for verifying moves of other nodes.

3. The method of claim 2, wherein the history is transferred to each joining node.

4. The method of claim 3, wherein the history is stored locally on the database of each of the nodes.

5. The method of claim 1, wherein the serverless video game executes for a session, and the method further comprises:
    storing the history to a block chain storage at a stop of play to enable later retrieval and resumption of the play.

6. The method of claim 1, wherein the serverless video game is executed during one or more sessions, and the method further comprises:
    storing the history from the databases of the nodes to a block chain storage to enable a later resumption of play during another session.

7. The method of claim 1, further comprising:
    joining, by either the first node or the second node, a third node to play the serverless video game;
    transferring, by either the first node or the second node, the history to the third node to enable a consensus algorithm to be executed on the third node in coordination with the consensus algorithm of each of the first and second nodes;
    wherein each move of the third node is configured to be verified by each of the first and second nodes.

8. The method of claim 1, wherein the consensus algorithm of each of the nodes is configured to process one or more zero-knowledge proofs for verifying moves made during play of the serverless video game.

9. The method of claim 8, wherein the zero-knowledge proofs use information from the history and information received from other nodes to verify said moves against the game rules processed by the application layer of each of the nodes.

10. The method of claim 1, wherein the consensus algorithm of each of the first node and the second node is configured to process one or more zero-knowledge proofs to determine a winner of the serverless video game, and wherein the consensus algorithm of each of the first node and the second node returns a true or false result as to whether the node won the serverless video game.

11. The method of claim 1, wherein the consensus algorithm of each of the first node and the second node is configured to process one or more zero-knowledge proofs to determine a winner of an auction in the serverless video game, and wherein the consensus algorithm of each of the first node and the second node returns a true or false result as to whether the node won the auction.

12. The method of claim 1, further comprising:
    accessing, by one of the first or second nodes, a server to request discovery of nodes for playing the serverless video game.

13. The method of claim 12, wherein said server is configured to process message data to enable the first or second nodes to message one or more of the nodes that were discovered for playing the serverless video game.

14. A method for processing a serverless video game, comprising:
    generating, at a first node, a notification to a second node to join play of the serverless video game during a session;
    confirming, by the first node, that the second node has joined to play the serverless video game for the session, the joining by the second node creating a peer-to-peer communication process for executing an application layer for the serverless video game;
    executing, at each of the first node and the second node a consensus algorithm for verifying actions processed by the application layer that runs game rules for the serverless video game, wherein said consensus algorithm of each of the first node and the second node respectively maintains a database for storing a history of said actions by each one of the first and second nodes, and said consensus algorithm is configured to independently process at each of the first and second nodes said verifying of each of the actions;
    generating, at the first node, a first action, and responsive to the first action sending to the second node a message regarding the first action, such that the second node is configured to receive the message regarding the first action by the first node, wherein the consensus algorithm at the second node is configured to validate or invalidate the first action, and wherein an anonymized function of said consensus algorithm at the second node independently processes the first action against said game rules for said validating or invalidating of the first action; and receiving, by the first node from the second node, a confirmation message regarding validity or invalidity of the first action by the first node;

wherein said history is stored to a server database upon termination of the session by the first and second nodes.

15. The method of claim 14, wherein the server database is a block chain storage.

16. The method of claim 14, wherein the consensus algorithm of each of the first node and the second node is configured to process one or more zero-knowledge proofs for verifying actions made during play of the serverless video game.

17. The method of claim 14, wherein the consensus algorithm of each of the first node and the second node is configured to process one or more zero-knowledge proofs to determine a winner of the serverless video game, and wherein the consensus algorithm of each of the first node and the second node returns a true or false result as to whether the node won the serverless video game.

18. The method of claim 14, wherein the consensus algorithm of each of the first node and the second node is configured to process one or more zero-knowledge proofs to determine a winner of an auction in the serverless video game, and wherein the consensus algorithm of each of the first node and the second node returns a true or false result as to whether the node won the auction.

19. A computer readable medium containing non-transitory program instructions for processing a serverless video game, wherein execution of the program instructions by one or more processors of a computer system causes the one or more processors to carry out the operations of:

generating, at a first node, a notification to a second node to join play of the serverless video game;

confirming, by the first node, that the second node has joined to play the serverless video game, the joining by the second node creating a peer-to-peer communication process for executing an application layer for the serverless video game;

executing, at each of the first node and the second node a consensus algorithm for verifying moves processed by the application layer that runs game rules for the serverless video game, wherein said consensus algorithm at each of the first node and the second node respectively maintains a database for storing a history of said moves by each one of the first and second nodes, and said consensus algorithm is configured to independently process at each of the first and second nodes said verifying of each of the moves;

generating, at the first node, a first move, and responsive to the first move sending to the second node a message regarding the first move, such that the second node is configured to receive the message regarding the first move by the first node, wherein the consensus algorithm at the second node is configured to validate or invalidate the first move, and wherein an anonymized function of said consensus algorithm at the second node independently processes the first move against said game rules for said validating or invalidating of the first move; and receiving, by the first node from the second node, a confirmation message regarding validity or invalidity of the first move by the first node.

\* \* \* \* \*